United States Patent
Tanaka et al.

[11] Patent Number: 5,814,806
[45] Date of Patent: Sep. 29, 1998

[54] CODE SHEET REPRESENTING MULTIPLE CODE INFORMATION AND METHOD FOR PRODUCING THE SAME

[75] Inventors: Yasuhiro Tanaka, Ashiya; Hiroaki Okayama, Yamatotakada; Shusuke Ono, Takatsuki; Kazutake Boku, Yao; Michihiro Yamagata, Osaka; Katsu Yamada, Matsubara; Yoshiharu Yamamoto, Toyonaka; Motonobu Yoshikawa, Osaka, all of Japan

[73] Assignee: Matsushita Electric Industrial Co., Ltd., Osaka, Japan

[21] Appl. No.: 774,158

[22] Filed: Dec. 26, 1996

Related U.S. Application Data

[63] Continuation of Ser. No. 340,169, Nov. 15, 1994, abandoned.

[30] Foreign Application Priority Data

Nov. 16, 1993 [JP] Japan ................................. 5-286379

[51] Int. Cl.⁶ ................................................. G06K 19/06
[52] U.S. Cl. ................................. 235/494; 235/462
[58] Field of Search .............................. 235/494, 468, 235/469, 462, 487

[56] References Cited

U.S. PATENT DOCUMENTS

| | | | |
|---|---|---|---|
| 3,471,684 | 10/1969 | Barezou | 235/469 |
| 3,473,027 | 10/1969 | Freeman | 235/469 |
| 3,990,043 | 11/1976 | Clark | 235/469 |
| 4,605,846 | 8/1986 | Duret et al. | |
| 4,889,367 | 12/1989 | Miller | |

FOREIGN PATENT DOCUMENTS

| | | |
|---|---|---|
| 58-38175 | 3/1983 | Japan |
| 1-292485 | 11/1989 | Japan |
| 1-305484 | 12/1989 | Japan |
| 2-39288 | 2/1990 | Japan |
| 3-182988 | 8/1991 | Japan |

*Primary Examiner*—Donald T. Hajec
*Assistant Examiner*—Karl Frech
*Attorney, Agent, or Firm*—Ratner & Prestia

[57] ABSTRACT

A plurality of types of ink having different wavelength characteristics are used for multiple printing of code information. When two or more types of ink are to be printed in an overlapping manner, in a region 8 in which one type of ink 4 and another type of ink 5 are printed in the overlapping manner, the ink 4 and the ink 5 are printed so as not to completely overlap each other by using a checkered pattern 9. As a result, the multiple printing can be performed without strict constraints on the wavelength characteristics of the ink.

28 Claims, 23 Drawing Sheets

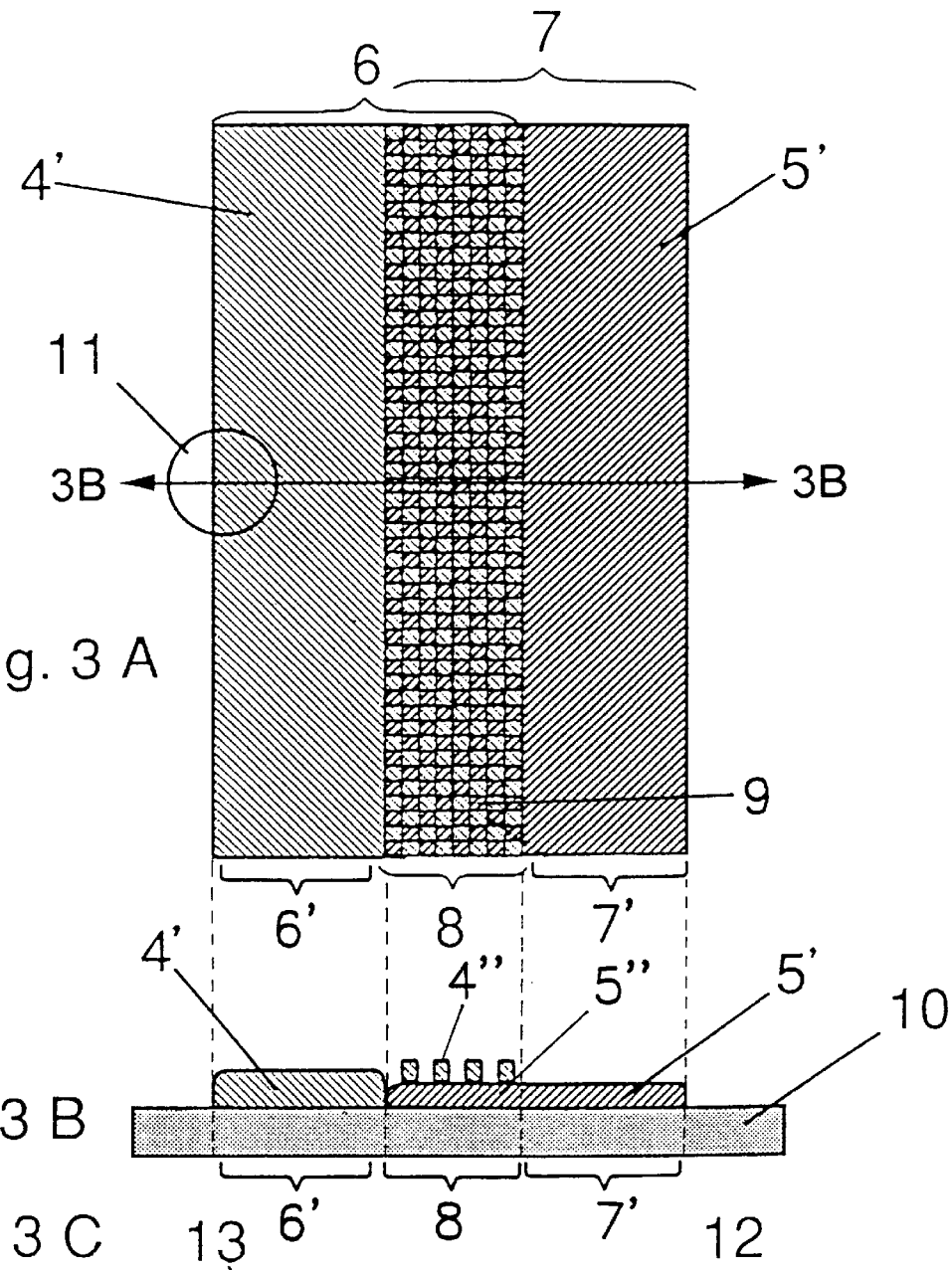
Fig. 3 A
Fig. 3 B
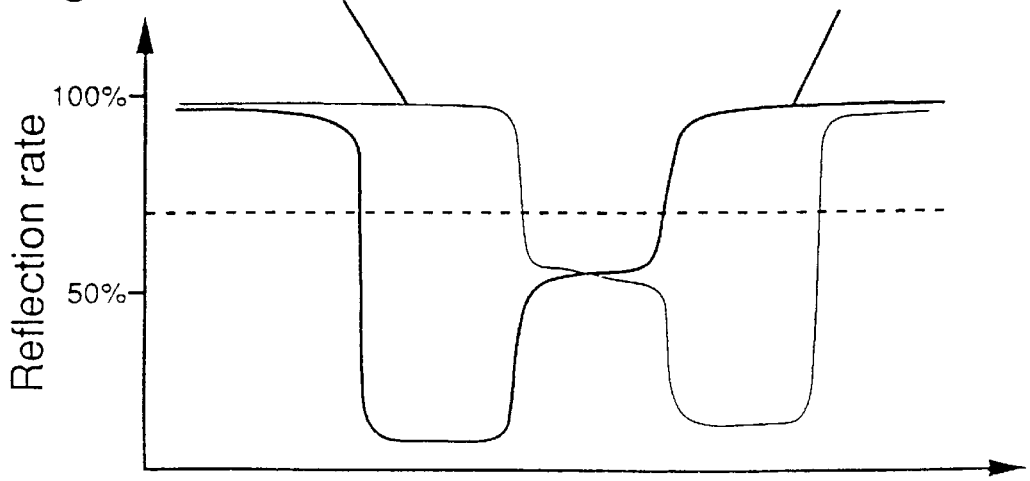
Fig. 3 C

Fig. 7      200

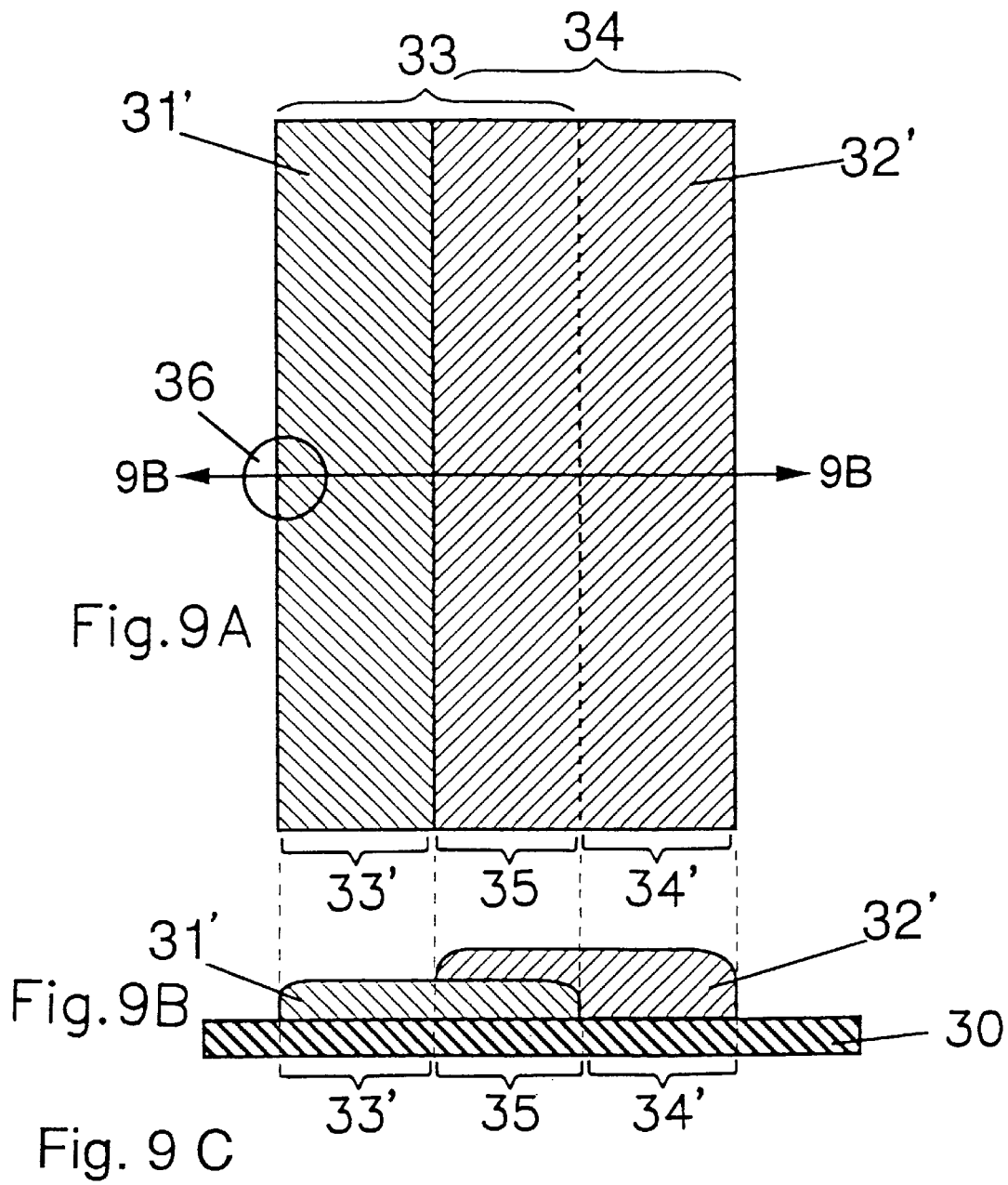
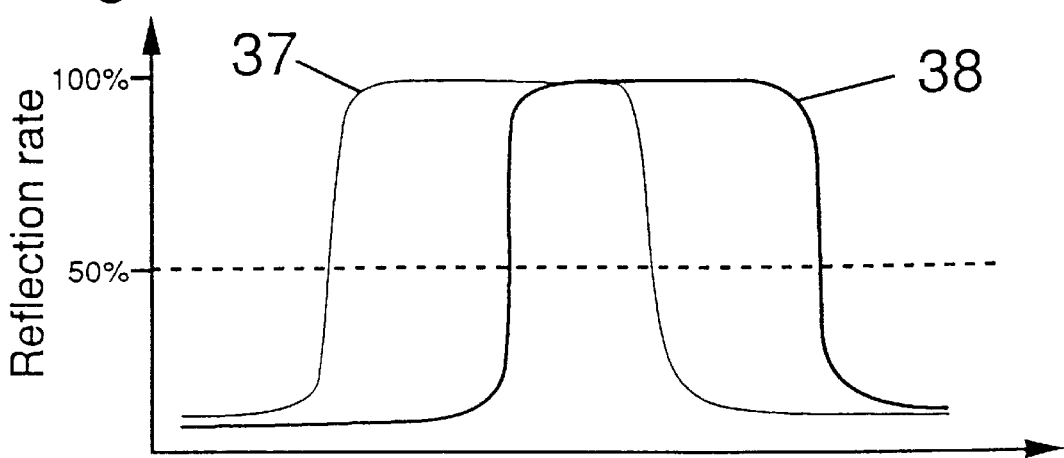

CODE SHEET REPRESENTING MULTIPLE CODE INFORMATION AND METHOD FOR PRODUCING THE SAME

This application is a continuation of application Ser. No. 08/340,169 filed Nov. 15, 1994, abandoned.

BACKGROUND OF THE INVENTION

1. Field of the Invention

The present invention relates to a code sheet indicating plural types of code information and a method for producing the code sheet. More particularly, the present invention relates to a bar code sheet on which, when a plurality of bar codes are to be printed, the plurality of bar codes can be printed in regions which are overlapped, and a method for producing the bar code sheet.

2. Description of the Related Art

Recently, various kinds of information are represented by bar codes. Typically, bar codes are attached to packages of commodity products, and utilized for managing the conditions of the commodity products such as the orders, the supplies, and the stock. In order for a large amount of information to be included in a small region, it is effective to have two or more types of bar codes printed in an overlapping manner. For example, Japanese Laid-Open Patent Publication No. 1-305484 discloses a method for printing two types of bar codes in an overlapping manner. A paper sheet used as a substrate material, which reflects both light in a visible range and light in an infrared range is used.

First, a first bar code is printed with a first ink. The first ink has a wavelength characteristic in that the absorption rate is high in the visible range but low in the infrared range. In addition, the first ink has a spectral characteristic in that the infrared rays are reflected.

Next, a second bar code is printed with a second ink in an overlapping manner in the region in which the first bar code has been printed with the first ink. The second ink has a wavelength characteristic in that the absorption rate is high in the infrared range but low in the visible range. On the other hand, the transmittance rate in the visible range is high. Accordingly, even if the second ink is superposed on the first ink, the wavelength characteristic of the first ink in the visible range can be sufficiently utilized. The transmittance rate of the first ink is low, regardless of the wavelength bands.

When the first bar code and the second bar code are printed in the above-described manner, only the first bar code printed with the first ink having a high absorption rate in the visible range can be perceived by the human eye. The first bar code is perceived as black bars by the human eye. The second bar code is transparent to the human eye.

When the second bar code is scanned by a bar code reader which emits infrared rays, the infrared rays are absorbed in the region in which the second bar code is printed, so that the amount of reflected light is decreased. When the paper sheet as the substrate material and the first bar code are scanned by the bar code reader which emits infrared rays, the amount of reflected light is not so much decreased because the infrared rays are reflected. Accordingly, it is possible to read only the information indicated by the second bar code printed with the second ink.

On the other hand, when the first bar code is scanned by a bar code reader which emits visible light, it is possible to read only the information indicated by the first bar code printed with the first ink. This is because the transmittance rate of the second ink is high in the visible range, so that the second ink has no influence on the read signal.

In this way, in the case where two types of bar codes are printed in the overlapping manner in the same region, the two types of bar codes can be independently read by using light in two kinds of wavelength bands.

However, in the above-described construction, the ink which is printed later, i.e., positioned on the upper side, is essentially required to have a characteristic in that the visible light is transmitted, and hence the type of applicable ink is disadvantageously limited.

SUMMARY OF THE INVENTION

The code sheet of this invention represents first code information and second code information. The code sheet includes: a printing medium including a first region in which the first code information is to be printed, a second region in which the second code information is to be printed, and a third region in which the first code information and the second code information are to be printed; a first section formed on a region of the first region of the printing medium excluding the third region, the first section being made of a first printing material; a second section formed on a region of the second region of the printing medium excluding the third region, the second section being made of a second printing material different from the first printing material; and a third section formed on the third region of the printing medium, the third section including a portion made of the first printing material and a portion made of the second printing material, wherein a reflection rate of the third section is substantially equal to a reflection rate obtained by averaging a reflection rate of the first printing material and a reflection rate of the second printing material with respect to light in a first wavelength band and light in a second wavelength band.

In one embodiment of the invention, the printing medium has a reflection characteristic for the light in the first wavelength band and the light in the second wavelength band; the first printing material has an absorption rate for the light in the first wavelength band, which is higher than that of the second printing material, and has a reflection rate for the light in the second wavelength band, which is higher than that of the second printing material; and the second printing material has a reflection rate of the light in the first wavelength band, which is higher than that of the first printing material, and has an absorption rate for the light in the second wavelength band, which is higher than that of the first printing material.

In another embodiment of the invention, the printing medium has an absorption characteristic for the light in the first wavelength band and the light in the second wavelength band; the first printing material has an absorption rate for the light in the first wavelength band, which is higher than that of the second printing material, and has a reflection rate for the light in the second wavelength band, which is higher than that of the second printing material; and the second printing material has a reflection rate of the light in the first wavelength band, which is higher than that of the first printing material, and has a transmittance rate for the light in the second wavelength band, which is higher than that of the first printing material.

In another embodiment of the invention, the third section includes: a first layer formed on the third region of the printing medium, the first layer being made of the second printing material; and a second layer formed on the first layer, the second layer being made of the first printing material, at least a part of the first layer not being covered with the second layer.

In another embodiment of the invention, the second layer is formed in a checkered pattern on the first layer.

In another embodiment of the invention, the second layer is formed in a striped pattern on the first layer.

In another embodiment of the invention, the third section includes: a first pattern formed on the third region of the printing medium, the first pattern being made of the first printing material; and a second pattern formed on the third region of the printing medium, the second pattern being made of the second printing material, each of the first pattern and the second pattern having a random size, and being arranged at a random position on the third region of the printing medium.

According to another aspect of the invention, a code sheet representing first code information and second code information is provided. The code sheet includes: a printing medium having an absorption characteristic for light in a first wavelength band and light in a second wavelength band, the printing medium including a first region in which the first code information is to be printed and a second region in which the second code information is to be printed; a first layer formed on the first region of the printing medium, the first layer being made of a first printing material; and a second layer formed on the second region of the printing medium to cover a part of the first layer, the second layer being made of second printing material different from the first printing material.

In one embodiment of the invention, the first printing material has a transmittance rate for the light in the first wavelength band, which is higher than that of the second printing material, and has a reflection rate for the light in the second wavelength band, which is higher than that of the second printing material; and the second printing material has a reflection rate for the light in the first wavelength band, which is higher than that of the first printing material, and has a transmittance rate for the light in the second wavelength band, which is higher than that of the first printing material.

In another embodiment of the invention, the first printing material has an absorption rate for the light in the first wavelength band, which is higher than that of the second printing material, and has a reflection rate for the light in the second wavelength band, which is higher than that of the second printing material; and the second printing material has a reflection rate for the light in the first wavelength band, which is higher than that of the first printing material, and has a transmittance rate for the light in the second wavelength band, which is higher than that of the first printing material.

In another embodiment of the invention, the first printing material has an absorption rate for the light in the first wavelength band, which is higher than that of the second printing material, and has a transmittance rate for the light in the second wavelength band, which is higher than that of the second printing material; and the second printing material has a transmittance rate for the light in the first wavelength band, which is higher than that of the first printing material, and has an absorption rate for the light in the second wavelength band, which is higher than that of the first printing material.

In another embodiment of the invention, the light in the first wavelength band is visible light, and the light in the second wavelength band is infrared rays.

In another embodiment of the invention, the light in the first wavelength band is first infrared rays, and the light in the second wavelength band is second infrared rays.

In another embodiment of the invention, each of the first code information and the second code information is one-dimensional code information.

In another embodiment of the invention, each of the first code information and the second code information is two-dimensional code information.

According to another aspect of the invention, a method for producing a code sheet on which first code information and second code information are printed is provided. The method includes the steps of: detecting a first region in which the first code information is to be printed; detecting a second region in which the second code information is to be printed; detecting a third region in which the first region and the second region are overlapped; forming a first layer formed on the first region, the first layer being made of a first printing material; forming a second layer on a region of the second region excluding the third region, the second layer being made of a second printing material different from the first printing material; and forming a third layer on the first layer corresponding to the third region, the third layer being made of the second printing material, the third layer being formed not to cover at least a part the first layer corresponding to the third region.

According to another aspect of the invention, a method for producing a code sheet on which first code information and second code information are printed is provided. The method includes the steps of: detecting a first region in which the first code information is to be printed; detecting a second region in which the second code information is to be printed; detecting a third region in which the first region and the second region are overlapped; forming a first layer on a region of the first region excluding the third region, the first layer being made of a first printing material; forming a second layer on a region of the second region excluding the third region, the second layer being made of a second printing material different from the first printing material; and arranging a plurality of first small pieces made of the first printing material and a plurality of second small pieces made of the second printing material on the third region.

Thus, the invention described herein makes possible the advantage of providing a code sheet in which multiple types of code information can be printed in an overlapping manner without adding any strict constraints to the characteristics of printing materials, and a method for producing the code sheet.

This and other advantages of the present invention will become apparent to those skilled in the art upon reading and understanding the following detailed description with reference to the accompanying figures.

BRIEF DESCRIPTION OF THE DRAWINGS

FIGS. 3A and 3B are diagrams showing the structure of a bar code sheet in Example 1 according to the invention.

FIG. 3C is a diagram showing the distribution of reflected light amount when the bar code sheet is scanned.

FIGS. 9A and 9B are diagrams showing the structure of a bar code sheet in Example 6 according to the invention.

FIG. 9C is a diagram showing the distribution of reflected light amount when the bar code sheet is scanned.

FIGS. 13A and 13B are diagrams showing the structure of a bar code sheet in Example 9 according to the invention.

FIG. 13C is a diagram showing the distribution of reflected light amount when the bar code sheet is scanned.

DESCRIPTION OF THE PREFERRED EMBODIMENTS

Hereinafter, the present invention will be described by way of illustrative examples with reference to the accompanying drawings.

EXAMPLE 1

Figure 1:
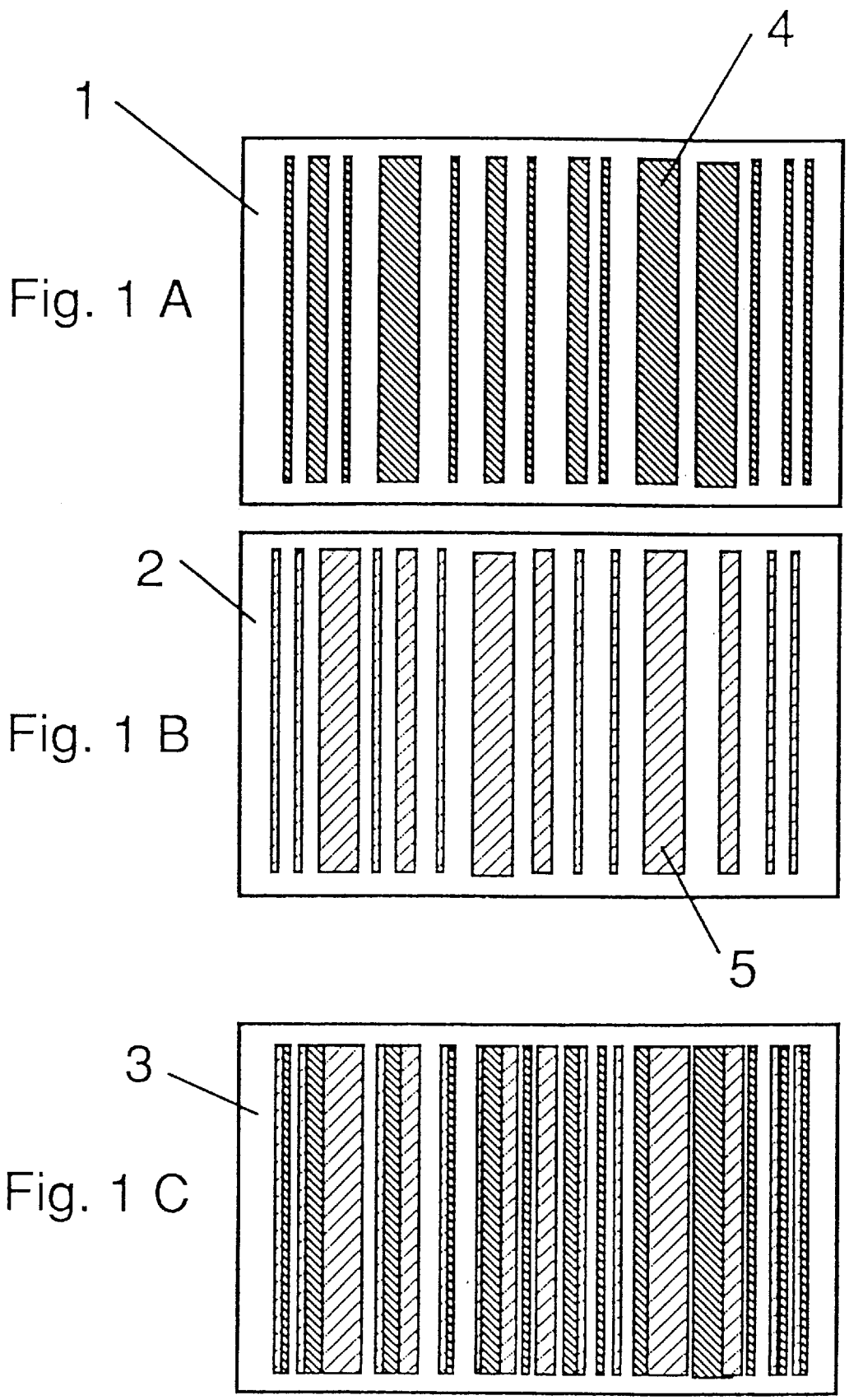
FIGS. 1A to 1C are diagrams for illustrating the printing of bar codes on a sheet in an overlapping manner.

FIG. 1A shows a bar code 1 printed with ink 4. FIG. 1B shows a bar code 2 printed with ink 5. FIG. 1C shows a bar code 3 obtained by printing the bar code 1 and the bar code 2 in an overlapping manner in one and the same region. The ink 4 and the ink 5 have different wavelength characteristics in different wavelength bands from each other.

Figure 2:
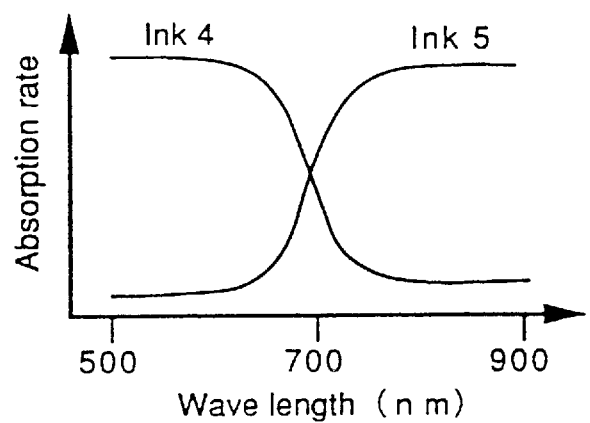
FIGS. 2A and 2B are diagrams showing the wavelength characteristics (absorption rate and reflection rate) of ink.
Figure 2:
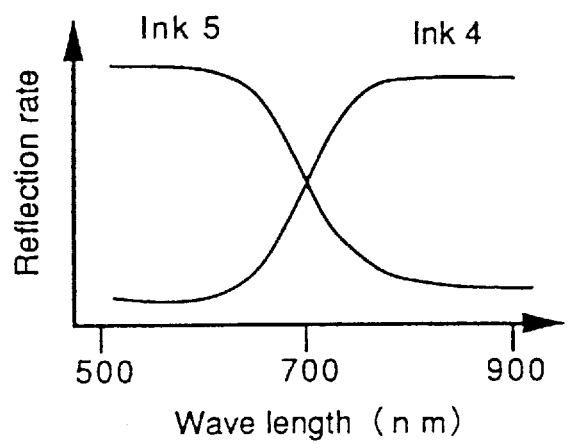

FIG. 2A shows the relationship between the wavelength band and the absorption rate for the ink 4 and the ink 5. FIG. 2B shows the relationship between the wavelength band and the reflection rate for the ink 4 and the ink 5. The ink 4 exhibits the absorption characteristic in the so-called visible range from 500 nm to 700 nm (FIG. 2A), and exhibits the reflection characteristic in the infrared range from 700 nm to 900 nm (FIG. 2B). The ink 5 exhibits the reflection characteristic in the visible range (FIG. 2B), and exhibits the absorption characteristic in the infrared range (FIG. 2A). As a result, the absorption rate of the ink 4 is higher than the absorption rate of the ink 5 in the visible range, and the absorption rate of the ink 5 is higher than the absorption rate of the ink 4 in the infrared range. In addition, the reflection rate of the ink 5 is higher than the reflection rate of the ink 4 in the visible range, and the reflection rate of the ink 4 is higher than the reflection rate of the ink 5 in the infrared range.

As described above, the ink 4 is used for printing the bar code 1 and the ink 5 is used for printing the bar code 2. Therefore, in the case where the region in which the bar code 1 is to be printed and the region in which the bar code 2 is to be printed are not overlapped, it is possible to independently read the bar code 1 and the bar code 2 by utilizing the wavelength characteristics of the ink 4 and the ink 5. For example, the bar code 2 can be read by scanning the bar code sheet with a semiconductor laser which emits visible light having a wavelength of 635 nm. The bar code 1 can be read by scanning the bar code sheet with a semiconductor laser which emits infrared rays having a wavelength of 830 nm.

Hereinafter, the bar code sheet in Example 1 according to the invention is described with reference to FIGS. 3A to 3C.

FIGS. 3A and 3B show the structure of the bar code sheet in Example 1 according to the invention. FIG. 3A is a plan view of the bar code sheet. A region 6 on a printing medium 10 is a region in which the bar code 1 is to be printed. A region 7 on the printing medium 10 is a region in which the bar code 2 is to be printed. A region 8 on the printing medium 10 is a region in which the bar code 1 and the bar code 2 are to be printed.

FIG. 3B is a cross-sectional view of the bar code sheet taken along the line A–A'. A region of the region 6 on the printing medium 10 except for the region 8 is designated by 6', and a region of the region 7 on the printing medium 10 except for the region 8 is designated by 7'. As shown in FIG. 3B, the bar code sheet includes the printing medium 10 having the reflection characteristics for visible light and infrared rays, a layer 4' of the ink 4 formed on the region 6' of the printing medium 10, a layer 5' of the ink 5 formed on the region 7' of the printing medium 10, and a layer 5" of the ink 5 formed on the region 8 of the printing medium 10. Both the layers 5' and 5" are formed of the ink 5, so that they can be a continuous single layer. The bar code sheet further has a layer 4" formed on the layer 5" corresponding to the region 8. The layer 4" is formed of the ink 4, and is formed so as not to cover at least a part of the layer 5". In this example, the layer 4" is divided into a plurality of minute portions, and the respective minute portions are arranged on the layer 5" in a checkered pattern in accordance with a pattern 9. In this way, the layer 4" of the ink 4 is discontinuously formed on the layer 5" of the ink 5, so that the layer 5" of the ink 5 is exposed between the gaps of the layer 4" of the ink 4. Accordingly, in the resultant bar code sheet, in the region 8 in which the bar code 1 and the bar code 2 are overlapped, the minute portions of the ink 4 and the minute portions of the ink 5 are alternately arranged.

Figure 21A:
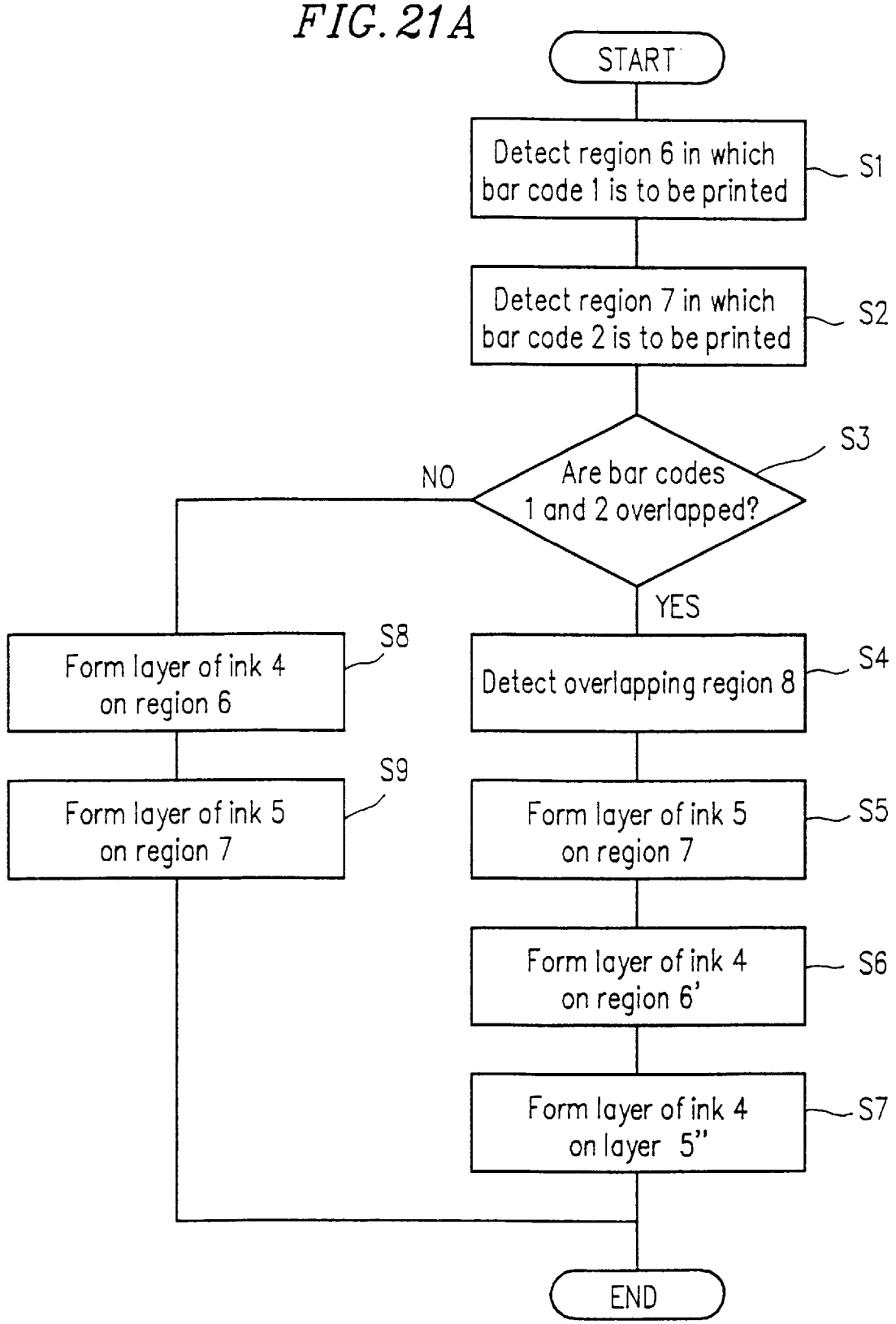
FIGS. 21A and 21B are flowcharts illustrating a method for producing a bar code sheet according to the invention.

Next, referring to FIG. 21A, the method for producing the bar code sheet having the above-described structure will be described.

In Step S1, a region 6 in which the bar code 1 is to be printed is detected.

In Step S2, a region 7 in which the bar code 2 is to be printed is detected.

In Step S3, it is judged whether the regions 6 and 7 are overlapped or not.

When it is judged that the regions 6 and 7 are overlapped, the process proceeds to Step S4. In Step S4, a region 8 in which the regions 6 and 7 are overlapped is detected.

In Step S5, a layer of the ink 5 is formed on the region 7. The layer corresponds to the above-described layers 5' and 5".

In Step S6, a layer 4' of the ink 4 is formed on a region 6' of the region 6 except for the region 8.

In Step S7, a layer 4" of the ink 4 is formed on the layer 5" corresponding to the region 8. The layer 4" is formed so as not to cover at least a part of the layer 5" corresponding to the region 8, in accordance with a predetermined pattern. The predetermined pattern is, for example, a checkered pattern. Thereafter, the process is terminated.

On the other hand, if it is judged that the regions 6 and 7 are not overlapped, the process proceeds to Step S8. In Step S8, a layer 4' of the ink 4 is formed on the region 6. In Step S9, a layer 5' of the ink 5 is formed on the region 7. The process steps in S8 and S9 are the same as those in the prior art. Thereafter, the process is terminated.

Next, a method for identifying the bar code 1 and the bar code 2 based on the distribution of rate of light reflected from the bar code sheet will be described.

FIG. 3C shows the distribution of rate of light reflected from the bar code sheet when a beam spot 11 is moved along the line A–A' shown in FIG. 3A. It is assumed that the size of the beam spot 11 is sufficiently larger than that of each of the minute portions of the layer 4".

When the bar code sheet is scanned by the beam in the visible range along the line A–A'., the reflection rate from the bar code sheet is varied as shown by curve 12. Specifically, the reflection rate from the bar code sheet is lower than 50% in the region corresponding to the region 6' because the layer 4' of the ink 4 absorbs the visible light. In the region corresponding to the region 8, the reflection rate becomes approximately 50% which is the averaged rate for the ink 4 and the ink 5 due to the layer 5" of the ink 5 and the layer 4" of the ink 4. In the region corresponding to the region 7', the reflection rate becomes approximately 100% because the layer 5' of the ink 5 reflects almost all visible light. In the region corresponding to the printing medium 10, the printing medium 10 reflects almost all visible light, so that the reflection rate is approximately 100%.

When the bar code sheet is scanned along the line A–A' by a beam in the infrared range, the reflection rate from the bar code sheet is varied as shown by curve 13. Specifically, the reflection rate from the bar code sheet is approximately 100% in the region corresponding to the region 6', because the layer 4' of the ink 4 reflects almost all infrared rays. In the region corresponding to the region 8, the reflection rate becomes approximately 50% which is the averaged rate for the ink 4 and the ink 5 due to the layer 5" of the ink 5 and the layer 4" of the ink 4. In the region corresponding to the region 7', the reflection rate is lower than 50%, because the layer 5' of the ink 5 absorbs the infrared rays. In the region corresponding to the printing medium 10, the printing medium 10 reflects almost all infrared rays, so that the reflection rate is approximately 100%.

As shown by dotted line in FIG. 3C, the case where the reflection rate from the bar code sheet is about 70% is set as a threshold value. In such a case, as the result of the scanning by the beam in the visible range, the region in which the reflection rate is lower than the threshold value is identified to be the bar code 1. As the result of the scanning by the beam in the infrared range, the region in which the reflection rate is lower than the threshold value is identified to be the bar code 2. In this way, the bar code 1 and the bar code 2 can be distinguished and identified.

According to the bar code sheet in this example, it is possible to print a plurality of bar codes in an overlapping manner, and to distinguishably read them. As a result, it is possible to print a larger amount of information within a prescribed region. In addition, neither the ink 4 nor the ink 5 is required to have a high transmittance rate for the light in the visible range. Accordingly, printing materials used for printing a plurality of bar codes in the overlapping manner can be more freely and desirably selected.

EXAMPLE 2

Hereinafter, a bar code sheet in Example 2 according to the invention will be described with reference to FIGS. 4A to 4C.

Figure 4:
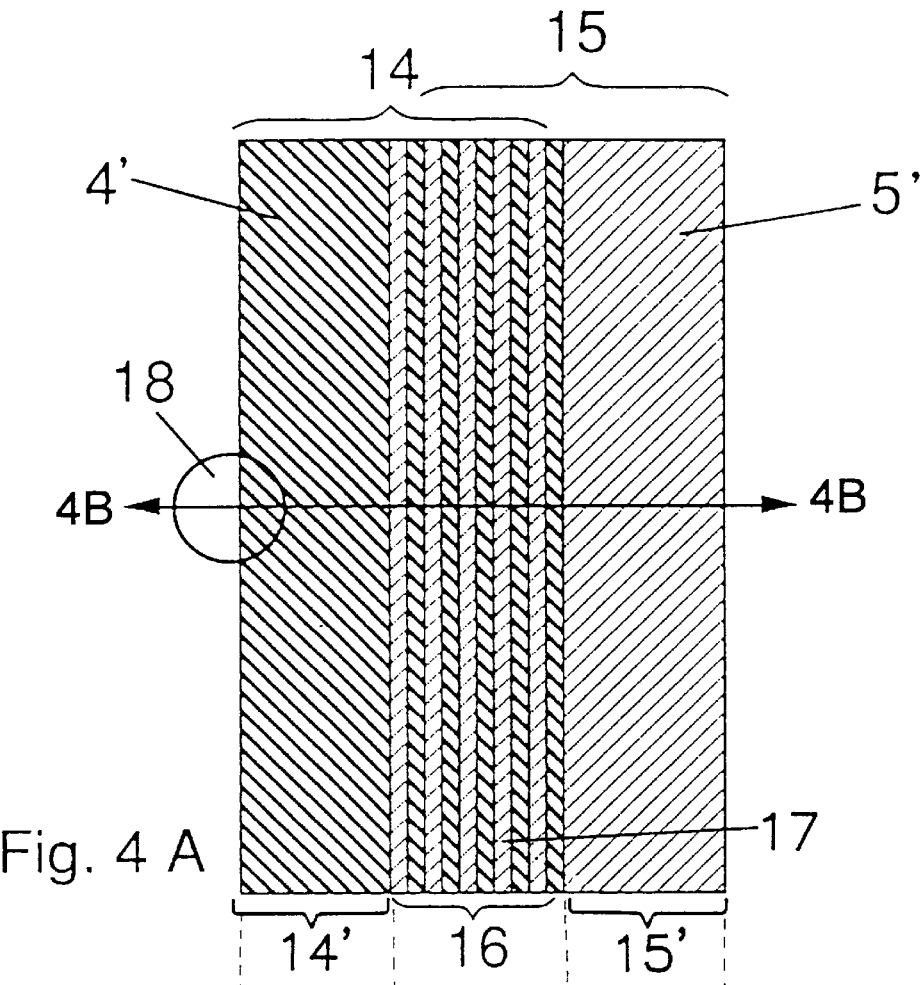
FIGS. 4A and 4B are diagrams showing the structure of a bar code sheet in Example 2 according to the invention.
FIG. 4C is a diagram showing the distribution of reflected light amount when the bar code sheet is scanned.
Figure 4B:
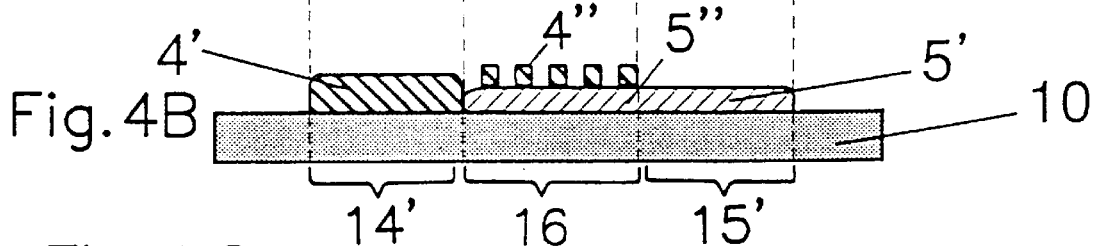
Figure 4:
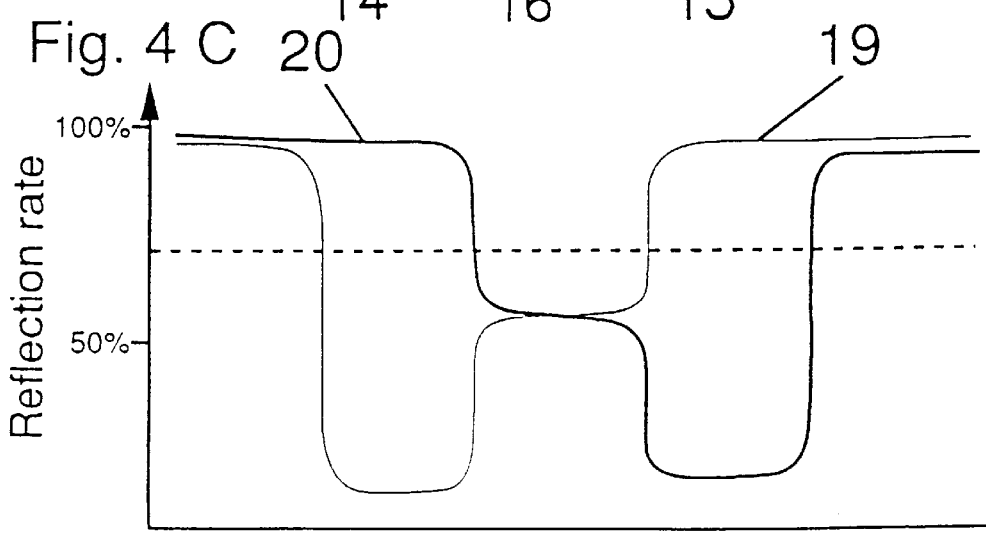

FIGS. 4A and 4B show the structure of the bar code sheet in Example 2 according to the invention. FIG. 4A is a plan view of the bar code sheet. A region 14 on a printing medium 10 is a region in which a bar code 1 is to be printed. A region 15 on the printing medium 10 is a region in which a bar code 2 is to be printed. A region 16 on the printing medium 10 is a region in which the bar code 1 and the bar code 2 are to be printed.

FIG. 4B is a cross-sectional view of the bar code sheet taken along the line A–A'. A region of the region 14 on the printing medium 10 except for the region 16 is designated by 14', and a region of the region 15 on the printing medium 10 except for the region 16 is designated by 15'.

As shown in FIG. 4B, the bar code sheet includes the printing medium 10 having the reflection characteristics for visible light and infrared rays, a layer 4' of the ink 4 formed on the region 14' of the printing medium 10, a layer 5' of the ink 5 formed on the region 15' of the printing medium 10, and a layer 5" of the ink 5 formed on the region 16 of the printing medium 10. Both the layers 5' and 5" are formed of the ink 5, so that they can be a continuous single layer. The bar code sheet further has a layer 4" formed on the layer 5" corresponding to the region 16. The layer 4" is formed of the ink 4, and is formed so as not to cover at least a part of the layer 5". In this example, the layer 4" is divided into a plurality of minute strip portions, and the respective minute strip portions are arranged on the layer 5" in accordance with a pattern 17. In this way, the layer 4" of the ink 4 is discontinuously formed on the layer 5" of the ink 5, so that the layer 5" of the ink 5 is exposed between the gaps of the layer 4" of the ink 4. Accordingly, in the resultant bar code sheet, in the region 16 in which the bar code 1 and the bar code 2 are overlapped, the minute portions of the ink 4 and the minute portions of the ink 5 are alternately arranged.

The method for producing the bar code sheet having the above-described structure is similar to that described in Example 1. In Step S7 in FIG. 21A, the layer 4" of the ink 4 is formed in accordance with a stripe-shaped pattern, instead of the checkered pattern.

Next, a method for identifying the bar code 1 and the bar code 2 based on the distribution of rate of light reflected from the bar code sheet will be described.

FIG. 4C shows the distribution of rate of light reflected from the bar code sheet when a beam spot 18 is moved along the line A–A' shown in FIG. 4A. It is assumed that the size of the beam spot 18 is sufficiently larger than the width of each of the minute strip portions of the layer 4".

When the bar code sheet is scanned by the beam in the visible range along the line A–A', the reflection rate from the bar code sheet is varied as shown by curve 19. Specifically, the reflection rate from the bar code sheet is lower than 50% in the region corresponding to the region 14' because the layer 4' of the ink 4 absorbs the visible light. In the region corresponding to the region 16, the reflection rate becomes approximately 50% which is the averaged rate for the ink 4 and the ink 5 due to the layer 5" of the ink 5 and the layer 4" of the ink 4. In the region corresponding to the region 15', the reflection rate becomes approximately 100% because the layer 5' of the ink 5 reflects almost all visible light. In the region corresponding to the printing medium 10, the printing medium 10 reflects almost all visible light, so that the reflection rate is approximately 100%.

When the bar code sheet is scanned along the line A–A' by a beam in the infrared range, the reflection rate from the bar code sheet is varied as shown by curve 20. Specifically, the reflection rate from the bar code sheet is approximately 100% in the region corresponding to the region 14', because the layer 4' of the ink 4 reflects almost all infrared rays. In the region corresponding to the region 16, the reflection rate becomes approximately 50% which is the averaged rate for the ink 4 and the ink 5 due to the layer 5" of the ink 5 and the layer 4" of the ink 4. In the region corresponding to the region 15', the reflection rate is lower than 50%, because the layer 5' of the ink 5 absorbs the infrared rays. In the region corresponding to the printing medium 10, the printing medium 10 reflects almost all infrared rays, so that the reflection rate is approximately 100%.

As shown by dotted line in FIG. 4C, the case where the reflection rate from the bar code sheet is about 70% is set as a threshold value. In such a case, as the result of the scanning by the beam in the visible range, the region in which the reflection rate is lower than the threshold value is identified to be the bar code 1. As the result of the scanning by the beam in the infrared range, the region in which the reflection rate is lower than the threshold value is identified to be the bar code 2. In this way, the bar code 1 and the bar code 2 can be distinguished and identified.

According to the bar code sheet in this example, it is possible to print a plurality of bar codes in an overlapping manner, and to distinguishably read them. As a result, it is possible to print a larger amount of information in a prescribed region. In addition, neither the ink 4 nor the ink 5 is required to have a high transmittance rate for the light in the visible range. Accordingly, printing materials used for printing a plurality of bar codes in the overlapping manner can be more freely and desirably selected.

EXAMPLE 3

Hereinafter, a bar code sheet in Example 3 according to the invention is described with reference to FIGS. 5A to 5C.

Figure 5:
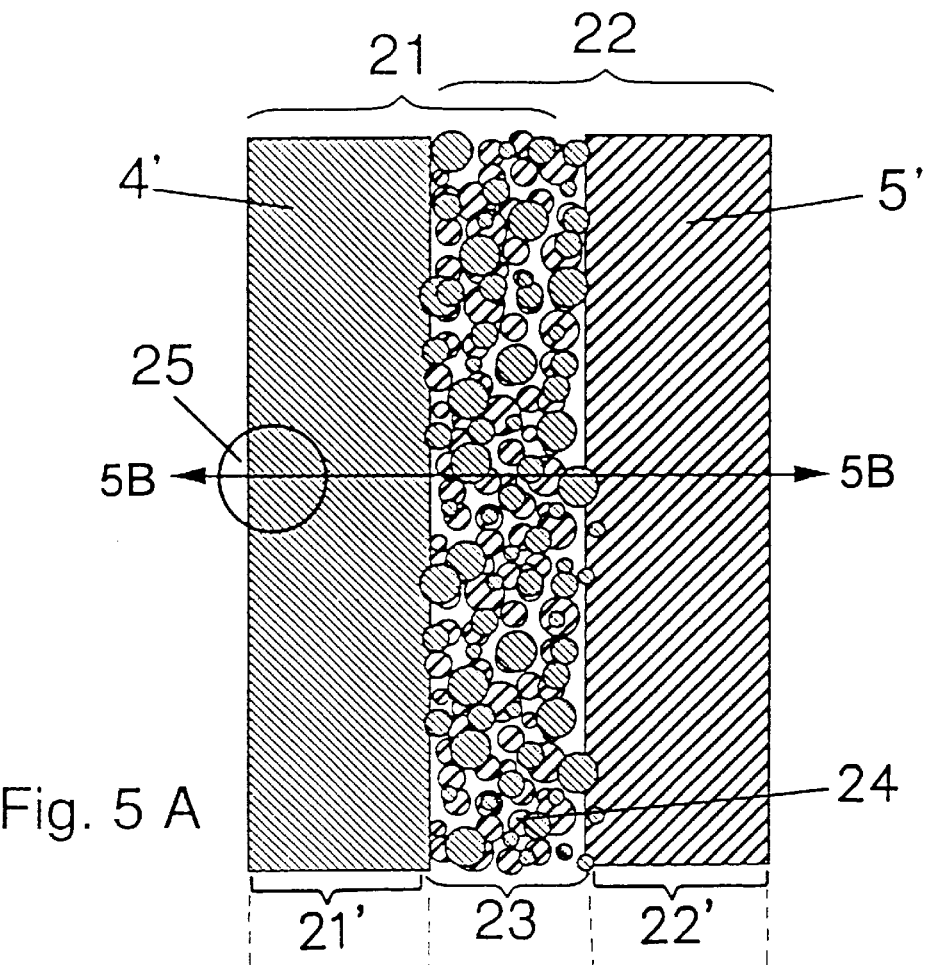
FIGS. 5A and 5B are diagrams showing the structure of a bar code sheet in Example 3 according to the invention.
FIG. 5C is a diagram showing the distribution of reflected light amount when the bar code sheet is scanned.
Figure 5B:
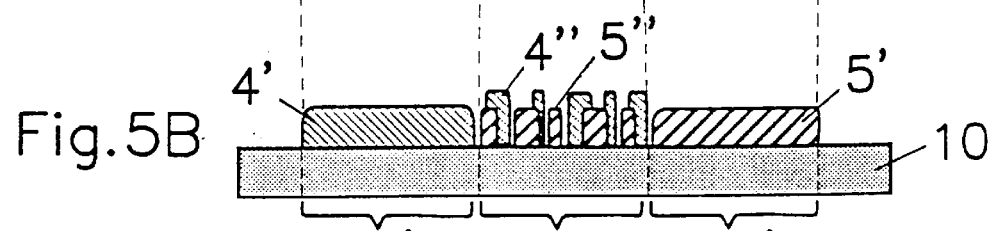
Figure 5:
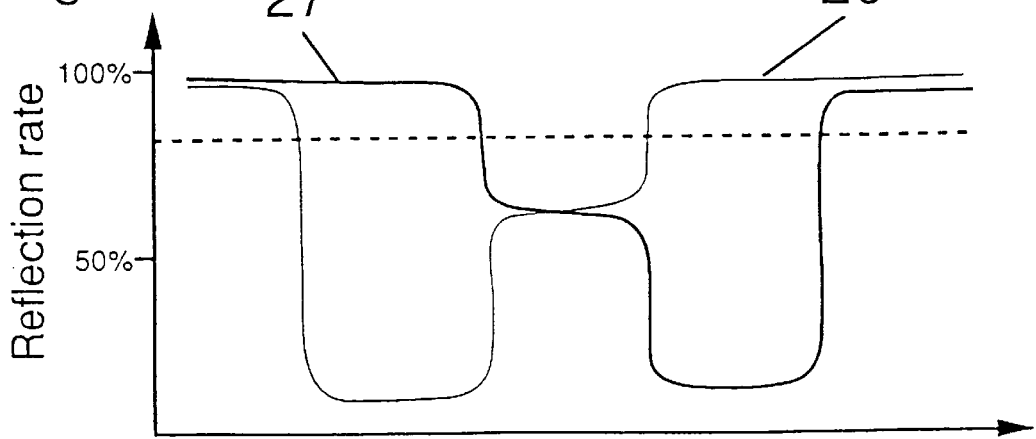

FIGS. 5A and 5B show the structure of the bar code sheet in Example 3 according to the invention. FIG. 5A is a plan view of the bar code sheet. A region 21 on a printing medium 10 is a region in which the bar code 1 is to be printed. A region 22 on the printing medium 10 is a region in which the bar code 2 is to be printed. A region 23 on the printing medium 10 is a region in which the bar code 1 and the bar code 2 are to be printed.

FIG. 5B is a cross-sectional view of the bar code sheet taken along the line A–A'. A region of the region 21 on the printing medium 10 except for the region 23 is designated by 21', and a region of the region 22 on the printing medium 10 except for the region 23 is designated by 22'.

As shown in FIG. 5B, the bar code sheet includes the printing medium 10 having the reflection characteristics for visible light and infrared rays, a layer 4' of the ink 4 formed on the region 21' of the printing medium 10, a layer 5' of the ink 5 formed on the region 22' of the printing medium 10, and a pattern 4" of the ink 4 and a pattern 5" of the ink 5 formed on the region 23 of the printing medium 10. The pattern 4" includes a plurality of circles arranged at random positions of the region 23. The circles have random minute radii, respectively. Also, the pattern 5" includes a plurality of circles arranged at random positions of the region 23. The circles have random minute radii, respectively. When a circle of the pattern 4" and a circle of the pattern 5" are overlapped, the circle of the pattern 4" is formed on the circle of the pattern 5". Alternatively, the circle of the pattern 5" may be formed on the circle of the pattern 4". However, the pattern 4" does not cover the entire pattern 5", and the patterns 4" and 5" do not cover all of the region 23. The reason is that the sizes of the circles and the positions thereof are randomly determined. In this way, in the resultant bar code sheet, the circles of the ink 4 and the circles of the ink 5 are arranged as random dots in the region 23.

Figure 21B:
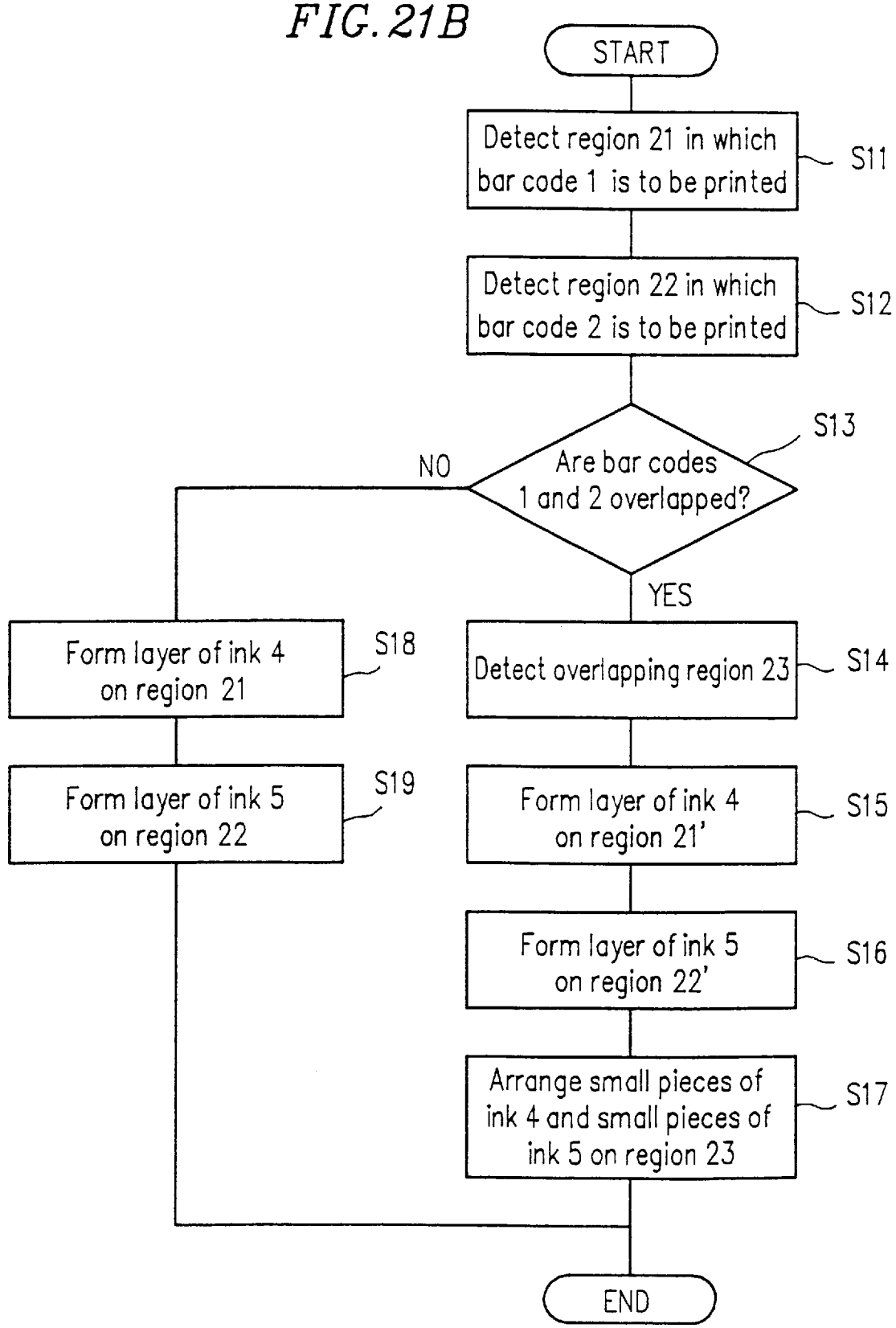

Next, referring to FIG. 21B, the method for producing the bar code sheet having the above-described structure will be described.

In Step S11, a region 21 in which the bar code 1 is to be printed is detected.

In Step S12, a region 22 in which the bar code 2 is to be printed is detected.

In Step S13, it is judged whether the regions 21 and 22 are overlapped or not.

When it is judged that the regions 21 and 22 are overlapped, the process proceeds to Step S14. In Step S14, a region 23 in which the regions 21 and 22 are overlapped is detected.

In Step S15, the layer 4' of the ink 4 is formed on a region 21' of the region 21 except for the region 23.

In Step S16, the layer 5' of the ink 5 is formed on a region 22' of the region 22 except for the region 23.

In Step S17, a plurality of small pieces of the ink 4 and a plurality of small pieces of the ink 5 are arranged in the region 23. These plurality of small pieces are, for example, circles having random minute radii. These plurality of small pieces are arranged at random positions in the region 23. Thereafter, the process is terminated.

On the other hand, if it is judged that the regions 21 and 22 are not overlapped, the process proceeds to Step S18. In Step S18, a layer 4' of the ink 4 is formed on the region 21. In Step S19, a layer 5' of the ink 5 is formed on the region 22. The process steps in S18 and S19 are the same as those in the prior art. Thereafter, the process is terminated.

Next, a method for identifying the bar code 1 and the bar code 2 based on the distribution of rate of light reflected from the bar code sheet will be described.

FIG. 5C shows the distribution of rate of light reflected from the bar code sheet when a beam spot 25 is moved along the line A–A' shown in FIG. 5A. It is assumed that the size of the beam spot 25 is sufficiently larger than that of the largest circle included in the patterns 4" and 5".

When the bar code sheet is scanned by the beam in the visible range along the line A–A', the reflection rate from the bar code sheet is varied as shown by curve 26. Specifically, the reflection rate from the bar code sheet is lower than 50% in the region corresponding to the region 21' because the layer 4' of the ink 4 absorbs the visible light. In the region corresponding to the region 23, the reflection rate becomes approximately 60% which is the averaged rate for the ink 4, the ink 5, and the printing medium 10 due to the pattern 5" of the ink 5 and the pattern 4" of the ink 4. In the region corresponding to the region 22', the reflection rate becomes approximately 100% because the layer 5' of the ink 5 reflects almost all visible light. In the region corresponding to the printing medium 10, the printing medium 10 reflects almost all visible light, so that the reflection rate is approximately 100%.

When the bar code sheet is scanned along the line A–A' by a beam in the infrared range, the reflection rate from the bar code sheet is varied as shown by curve 27. Specifically, the reflection rate from the bar code sheet is approximately 100% in the region corresponding to the region 21', because the layer 4' of the ink 4 reflects almost all infrared rays. In the region corresponding to the region 23, the reflection rate becomes approximately 60% which is the averaged rate for the ink 4, the ink 5, and the printing medium 10 due to the pattern 5" of the ink 5 and the pattern 4" of the ink 4. In the region corresponding to the region 22', the reflection rate is lower than 50%, because the layer 5' of the ink 5 absorbs the infrared rays. In the region corresponding to the printing medium 10, the printing medium 10 reflects almost all infrared rays, so that the reflection rate is approximately 100%.

As shown by dotted line in FIG. 5C, the case where the reflection rate from the bar code sheet is about 80% is set as a threshold value. In such a case, as the result of the scanning by the beam in the visible range, the region in which the reflection rate is lower than the threshold value is identified to be the bar code 1. As the result of the scanning by the beam in the infrared range, the region in which the reflection rate is lower than the threshold value is identified as the bar code 2. In this way, the bar code 1 and the bar code 2 can be distinguished and identified.

According to the bar code sheet in this example, it is possible to print a plurality of bar codes in an overlapping manner, and to distinguishably read them. As a result, it is possible to print a larger amount of information in a prescribed region. In addition, neither the ink 4 nor the ink 5 is required to have a high transmittance rate for the light in the visible range. Accordingly, printing materials used for printing a plurality of bar codes in the overlapping manner can be more freely and desirably selected. Moreover, it is sufficient that the circles of the pattern 4" and the circles of the pattern 5" are arranged randomly on the region 23, so that precise positioning is not required.

EXAMPLE 4

Hereinafter, a bar code sheet in Example 4 according to the invention will be described.

Figure 6:
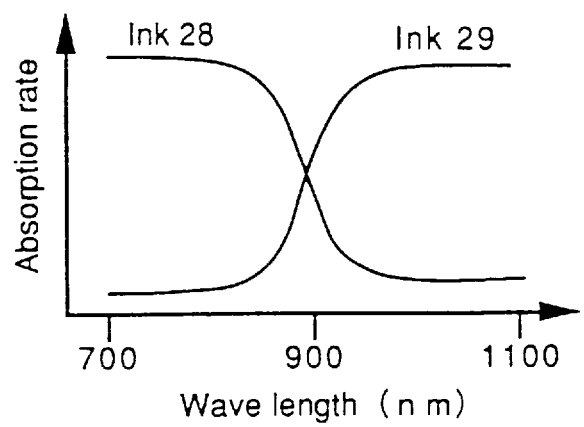
FIGS. 6A and 6B are diagrams showing the wavelength characteristics (absorption rate and reflection rate) of ink.
Figure 6:
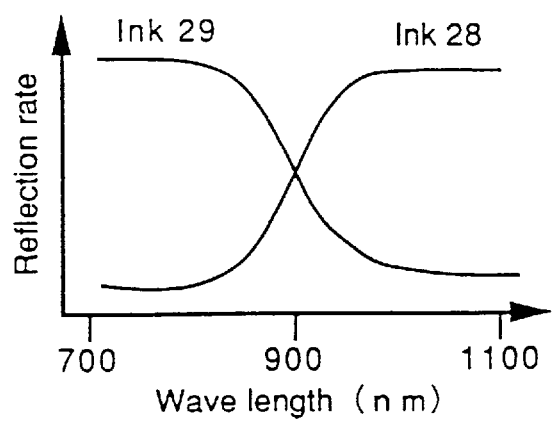

FIG. 6A shows the relationship between the wavelength band and the absorption rate for ink 28 and ink 29. FIG. 6B shows the relationship between the wavelength band and the reflection rate for the ink 28 and the ink 29. The ink 28 exhibits the absorption characteristic in a first infrared range from 700 nm to 900 nm (FIG. 6A), and exhibits the reflection characteristic in a second infrared range from 900 nm to 1100 nm (FIG. 6B). The ink 29 exhibits the reflection characteristic in the first infrared range (FIG. 6B), and exhibits the absorption characteristic in the second infrared range (FIG. 6A). As a result, the absorption rate of the ink 28 is higher than the absorption rate of the ink 29 in the first infrared range, and the absorption rate of the ink 29 is higher than the absorption rate of the ink 28 in the second infrared range. In addition, the reflection rate of the ink 29 is higher than the reflection rate of the ink 28 in the first infrared range, and the reflection rate of the ink 28 is higher than the reflection rate of the ink 29 in the second infrared range.

By using the ink 28 and the ink 29 having the above-described wavelength characteristics, a bar code sheet having the same structure as that of any of Examples 1 to 3 can be obtained. As the read light for reading the bar code, infrared rays having a wavelength of 800 nm, and infrared rays having a wavelength of 1000 nm are used. The distribution of reflection rate of light reflected from the bar code sheet is similar to those in Examples 1 to 3.

Therefore, even when the ink 28 and the ink 29 are used, the same effects as those in Examples 1 to 3 can be obtained. In addition, when the ink 28 and the ink 29 have transmission characteristics in the visible range, the bar codes printed with the ink 28 and the ink 29 are transparent to the human eye. For example, when a bar code is printed on a commodity product, the appearance of the product is not degraded.

EXAMPLE 5

Next, a bar code sheet in Example 5 according to the invention will be described.

In Examples 1 to 4 described above, the present invention is applied to one-dimensional bar codes. However, the present invention is not limited to such one-dimensional types. It is possible to apply the present invention to two-dimensional bar codes.

Figure 7:
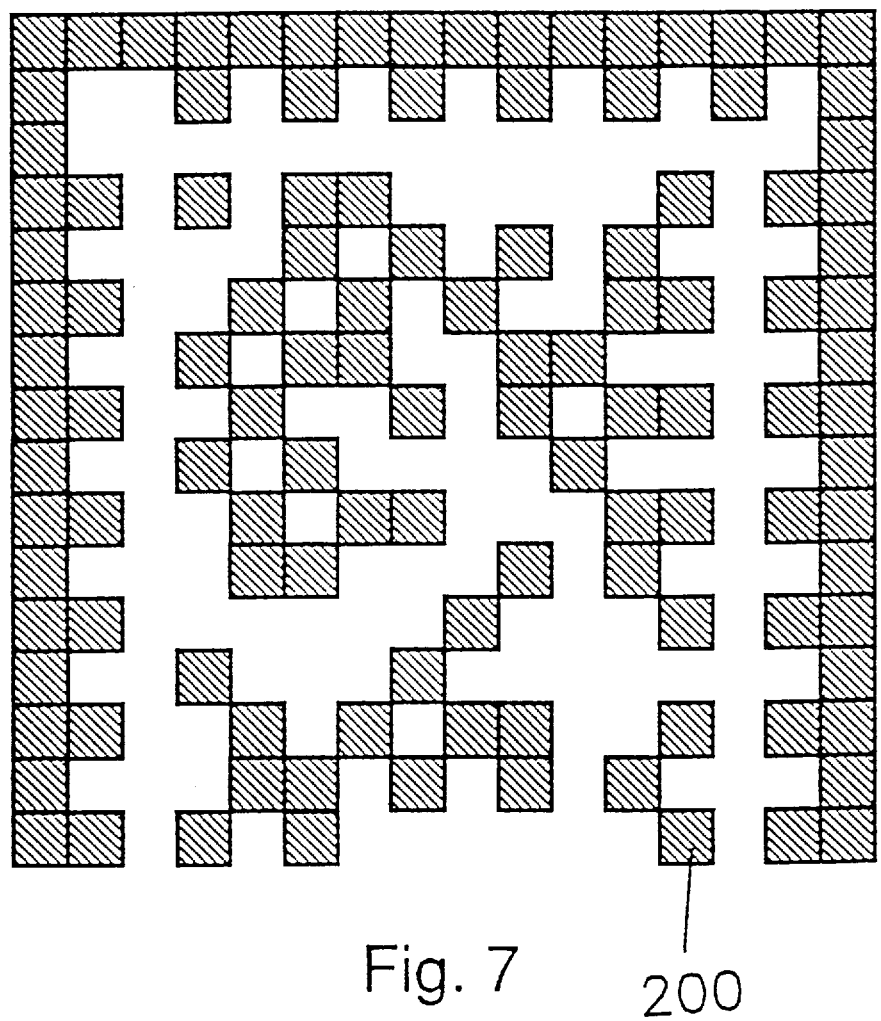
FIG. 7 is a diagram showing an exemplary two-dimensional bar code.

FIG. 7 shows an exemplary two-dimensional bar code. The two-dimensional bar code is obtained by combining minimum patterns 200. For example, whether the minimum patterns 200 exist at predetermined positions or not is detected by a two-dimensional CCD device, so that the two-dimensional bar code can be read.

Similar to Examples 1 through 4, in the case where a first ink layer is discontinuously formed on a second ink layer in a region in which a plurality of two-dimensional bar codes are overlapped, and the second ink layer is exposed through gaps of the first ink layer, so that a plurality of two-dimensional bar codes can be printed in an overlapping manner, and they can be appropriately read.

As shown in FIG. 7, the overlap region is a rectangular array having a plurality of respectively different parallel rows, each row including a plurality of minimum patterns 200, which in the examplary embodiment are rectangular areas. Some of the rectangular areas 200 are first areas having the first printing material as a top layer, and some of the rectangular are second areas having the second printing material as a top layer.

Each row in the two-dimensional bar code has a sequence of first and/or second areas. Each of the rows defines a respectively different sequence. The rectangular array may include an assymetrical two dimensional pattern of first and second areas therein, as shown.

EXAMPLE 6

Figure 8:
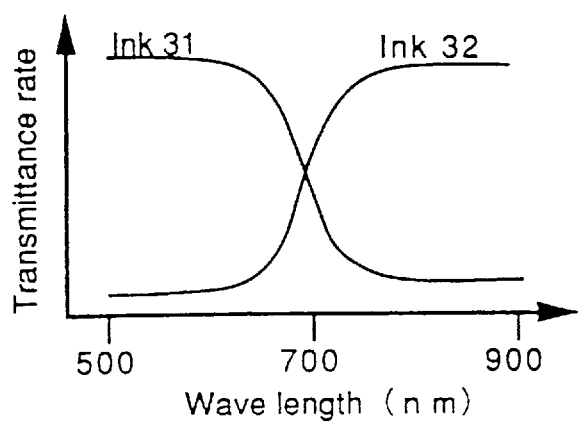
FIGS. 8A and 8B are diagrams showing the wavelength characteristics (transmittance rate and reflection rate) of ink.
Figure 8:
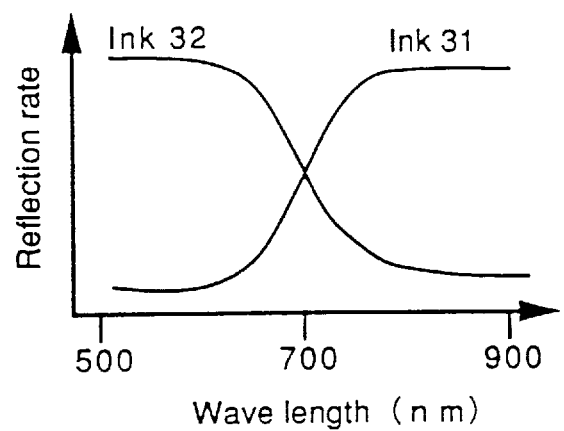

FIG. 8A shows the relationship between the wavelength band and the transmittance rate for ink 31 and ink 32. FIG.

8B shows the relationship between the wavelength band and the reflection rate for the ink 31 and the ink 32. The ink 31 exhibits the transmission characteristic in the so-called visible range from 500 nm to 700 nm (FIG. 8A), and exhibits the reflection characteristic in the infrared range from 700 nm to 900 nm (FIG. 8B). The ink 32 exhibits the reflection characteristic in the visible range (FIG. 8B), and exhibits the transmission characteristic in the infrared range (FIG. 8A). As a result, the transmittance rate of the ink 31 is higher than the transmittance rate of the ink 32 in the visible range, and the transmittance rate of the ink 32 is higher than the transmittance rate of the ink 31 in the infrared range. In addition, the reflection rate of the ink 32 is higher than the reflection rate of the ink 31 in the visible range, and the reflection rate of the ink 31 is higher than the reflection rate of the ink 32 in the infrared range.

The ink 31 is used for printing a bar code 1 and the ink 32 is used for printing a bar code 2. Therefore, in the case where the region in which the bar code 1 is to be printed and the region in which the bar code 2 is to be printed are not overlapped, it is possible to independently read the bar code 1 and the bar code 2 by utilizing the wavelength characteristics of the ink 31 and the ink 32. For example, the bar code 2 can be read by scanning the bar code sheet with a semiconductor laser which emits visible light having a wavelength of 635 nm. The bar code 1 can be read by scanning the bar code sheet with a semiconductor laser which emits infrared rays having a wavelength of 830 nm.

Hereinafter, the bar code sheet in Example 6 according to the invention will be described with reference to FIGS. 9A to 9C.

FIGS. 9A and 9B show the structure of the bar code sheet in Example 6 according to the invention. FIG. 9A is a plan view of the bar code sheet. A region 33 on a printing medium 30 is a region in which the bar code 1 is to be printed. A region 34 on the printing medium 30 is a region in which the bar code 2 is to be printed. A region 35 on the printing medium 30 is a region in which the bar code 1 and the bar code 2 are to be printed.

FIG. 9B is a cross-sectional view of the bar code sheet taken along the line A–A'. As shown in FIG. 9B, the bar code sheet includes the printing medium 30 having the absorption characteristics for visible light and infrared rays, a layer 31' of the ink 31 formed on the region 33 of the printing medium 30, a layer 32' of the ink 32 formed on the region 34 so as to cover a part of the layer 31'.

Next, a method for identifying the bar code 1 and the bar code 2 based on the distribution of reflection rate of light reflected from the bar code sheet will be described. A region of the region 33 of the printing medium 30 except for the region 35 is designated by 33', and a region of the region 34 of the printing medium 30 except for the region 35 is designated by 34'.

FIG. 9C shows the distribution of reflection rate of light reflected from the bar code sheet when a beam spot 36 is moved along the line A–A' shown in FIG. 9A.

When the bar code sheet is scanned by the beam in the visible range along the line A–A', the reflection rate from the bar code sheet is varied as shown by curve 38. Specifically, the reflection rate from the bar code sheet is lower than 50% in the region corresponding to the region 33' because the layer 31' of the ink 31 transmits the visible light and the printing medium 30 absorbs the visible light. In the region corresponding to the region 34, the reflection rate becomes approximately 100% because the layer 32' of the ink 32 reflects almost all visible light. In the region corresponding to the printing medium 30, the printing medium 30 absorbs almost all visible light, so that the reflection rate is lower than 50%.

When the bar code sheet is scanned along the line A–A' by a beam in the infrared range, the reflection rate from the bar code sheet is varied as shown by curve 37. Specifically, the reflection rate from the bar code sheet is approximately 100% in the region corresponding to the region 33', because the layer 31' of the ink 31 reflects almost all infrared rays. In the region corresponding to the region 35, the reflection rate becomes approximately 100% because the layer 32' of the ink 32 transmits the infrared rays and the layer 31' of the ink 31 reflects almost all infrared rays. In the region corresponding to the region 34', the reflection rate is lower than 50% because the layer 32' of the ink 32 transmits the infrared rays, and the printing medium 30 absorbs the infrared rays. In the region corresponding to the printing medium 30, the printing medium 30 absorbs the infrared rays, so that the reflection rate is lower than 50%.

As shown by dotted line in FIG. 9C, the case where the reflection rate from the bar code sheet is about 50% is set as a threshold value. In such a case, as the result of the scanning by the beam in the visible range, the region in which the reflection rate is higher than the threshold value is identified to be the bar code 2. As the result of the scanning by the beam in the infrared range, the region in which the reflection rate is higher than the threshold value is identified as the bar code 1. In this way, the bar code 1 and the bar code 2 can be distinguished and identified.

In this example, the layer 32' of the ink 32 is formed so as to cover a part of the layer 31' of the ink 31. Alternatively, the layer 31' may be formed on the layer 32'. In the case where the layer 31' of the ink 31 is formed so as to cover a part of the layer 32' of the ink 32, it is possible to distinguish the bar code 1 from the bar code 2 in the same way as described above.

According to the bar code sheet in this example, it is possible to print a plurality of bar codes in an overlapping manner, and to distinguishably read them. As a result, it is possible to print a larger amount of information in a prescribed region. In addition, when the ink 31 and the ink 32 are printed in the overlapping manner, it is possible to obtain a bar code sheet having desired wavelength characteristics irrespective of the superposing order of the ink 31 and the ink 32.

EXAMPLE 7

Hereinafter, a bar code sheet in Example 7 according to the invention will be described.

Figure 10:
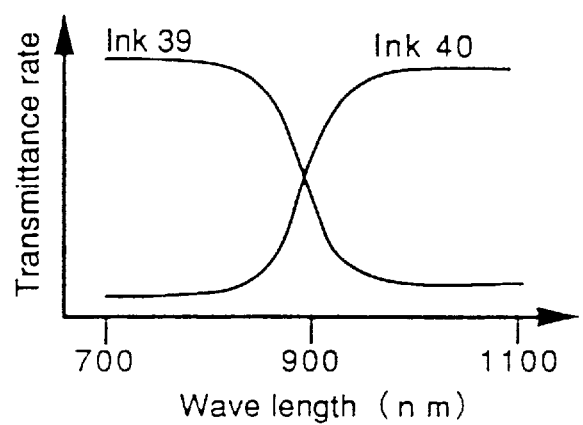
FIGS. 10A and 10B are diagrams showing the wavelength characteristics (transmittance rate and reflection rate) of ink.
Figure 10:
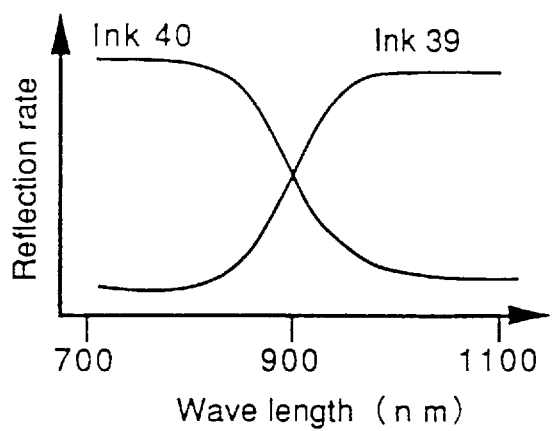

FIG. 10A shows the relationship between the wavelength band and the transmittance rate for ink 39 and ink 40. FIG. 10B shows the relationship between the wavelength band and the reflection rate for the ink 39 and the ink 40. The ink 39 exhibits the transmission characteristic in a first infrared range from 700 nm to 900 nm (FIG. 10A), and exhibits the reflection characteristic in a second infrared range from 900 nm to 1100 nm (FIG. 10B). The ink 40 exhibits the reflection characteristic in the first infrared range (FIG. 10B), and exhibits the transmission characteristic in the second infrared range (FIG. 10A). As a result, the transmittance rate of the ink 39 is higher than the transmittance rate of the ink 40 in the first infrared range, and the transmittance rate of the ink 40 is higher than the transmittance rate of the ink 39 in the second infrared range. In addition, the reflection rate of the ink 40 is higher than the reflection rate of the ink 39 in the first infrared range, and the reflection rate of the ink 39 is higher than the reflection rate of the ink 40 in the second infrared range.

By using the ink 39 and the ink 40 having the above-described wavelength characteristics, a bar code sheet having the same structure as that of Example 6 can be obtained. As the read light for reading the bar code, infrared rays having a wavelength of 800 nm, and infrared rays having a wavelength of 1000 nm are used. The distribution of reflection rate of light reflected from the bar code sheet is similar to that in Example 6.

Therefore, even when the ink 39 and the ink 40 are used, the same effects as those in Example 6 can be obtained. In addition, when the ink 39 and the ink 40 have transmission characteristics in the visible range, the bar codes printed with the ink 39 and the ink 40 are transparent to the human eye. For example, when a bar code is printed on a commodity product, the appearance of the product is not degraded.

EXAMPLE 8

Figure 11:
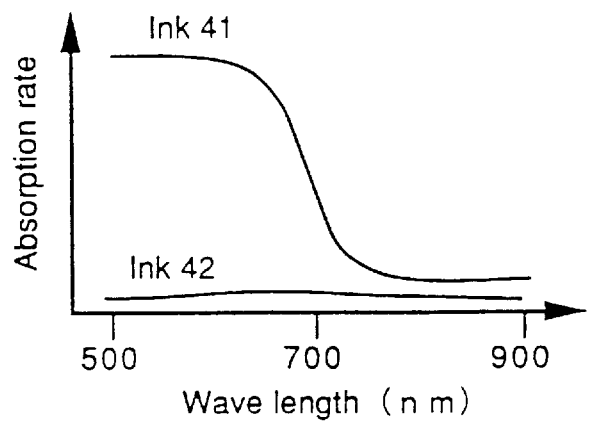
FIGS. 11A to 11C are diagrams showing the wavelength characteristics (absorption rate, transmittance rate, and reflection rate) of ink.
Figure 11:
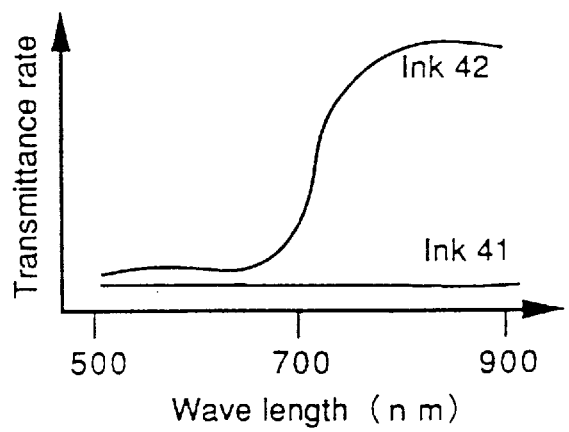
Figure 11:
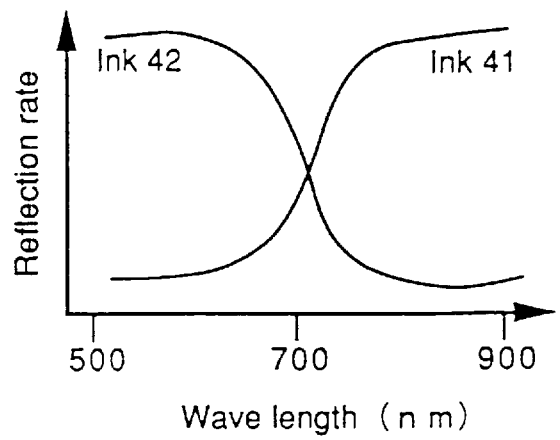

FIG. 11A shows the relationship between the wavelength band and the absorption rate for ink 41 and ink 42. FIG. 11B shows the relationship between the wavelength band and the transmittance rate for the ink 41 and the ink 42. FIG. 11C shows the relationship between the wavelength band and the reflection rate for the ink 41 and the ink 42. The ink 41 exhibits the absorption characteristic in the so-called visible range from 500 nm to 700 nm (FIG. 11A), and exhibits the reflection characteristic in the infrared range from 700 nm to 900 nm (FIG. 11C). The ink 42 exhibits the reflection characteristic in the visible range (FIG. 11C), and exhibits the transmission characteristic in the infrared range (FIG. 11B). The ink 41 always has a lower transmittance rate irrespective of the wavelengths. The ink 42 always has a lower absorption rate irrespective of the wavelengths. As a result, the absorption rate of the ink 41 is higher than the absorption rate of the ink 42 in the visible range, and the transmittance rate of the ink 42 is higher than the transmittance rate of the ink 41 in the infrared range. In addition, the reflection rate of the ink 42 is higher than the reflection rate of the ink 41 in the visible range, and the reflection rate of the ink 41 is higher than the reflection rate of the ink 42 in the infrared range.

The ink 41 is used for printing a bar code 1 and the ink 42 is used for printing a bar code 2. Therefore, in the case where the region in which the bar code 1 is to be printed and the region in which the bar code 2 is to be printed are not overlapped, it is possible to independently read the bar code 1 and the bar code 2 by utilizing the wavelength characteristics of the ink 41 and the ink 42. For example, the bar code 2 can be read by scanning the bar code sheet with a semiconductor laser which emits visible light having a wavelength of 635 nm. The bar code 1 can be read by scanning the bar code sheet with a semiconductor laser which emits infrared rays having a wavelength of 830 nm.

Hereinafter, the bar code sheet in Example 8 according to the invention is described with reference to FIGS. 12A to 12C.

Figure 12:
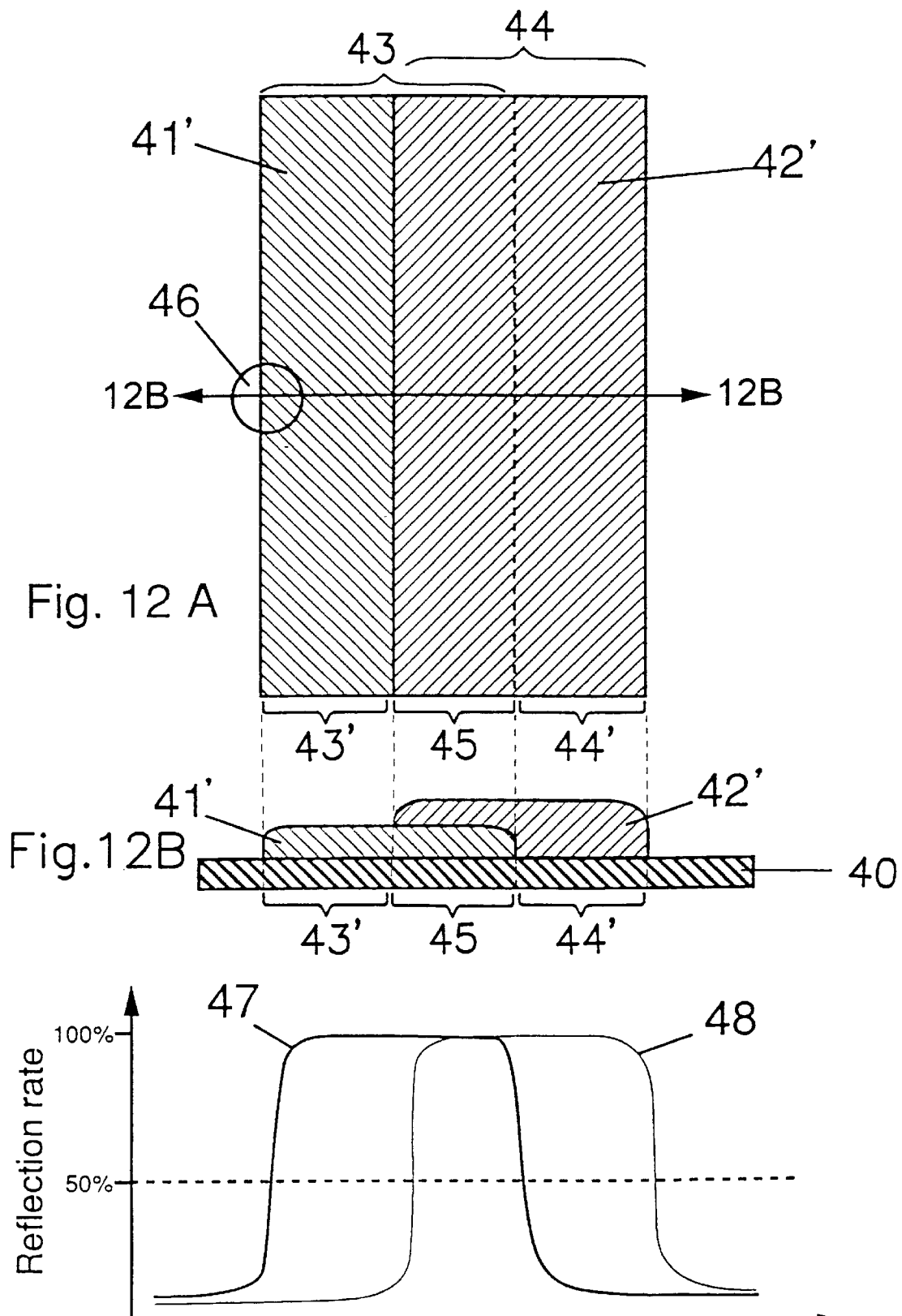
FIGS. 12A and 12B are diagrams showing the structure of a bar code sheet in Example 8 according to the invention.
FIG. 12C is a diagram showing the distribution of reflected light amount when the bar code sheet is scanned.

FIGS. 12A and 12B show the structure of the bar code sheet in Example 8 according to the invention. FIG. 12A is a plan view of the bar code sheet. A region 43 on a printing medium 40 is a region in which the bar code 1 is to be printed. A region 44 on the printing medium 40 is a region in which the bar code 2 is to be printed. A region 45 on the printing medium 40 is a region in which the bar code 1 and the bar code 2 are to be printed.

FIG. 12B is a cross-sectional view of the bar code sheet taken along the line A–A'. As shown in FIG. 12B, the bar code sheet includes the printing medium 40 having the absorption characteristics for visible light and infrared rays, a layer 41' of the ink 41 formed on the region 43 of the printing medium 40, a layer 42' of the ink 42 formed on the region 44 so as to cover a part of the layer 41'.

Next, a method for identifying the bar code 1 and the bar code 2 based on the distribution of reflection rate of light reflected from the bar code sheet will be described. A region of the region 43 of the printing medium 40 except for the region 45 is designated by 43', and a region of the region 44 of the printing medium 40 except for the region 45 is designated by 44'.

FIG. 12C shows the distribution of reflection rate of light reflected from the bar code sheet when a beam spot 46 is moved along the line A–A' shown in FIG. 12A.

When the bar code sheet is scanned by the beam in the visible range along the line A–A', the reflection rate from the bar code sheet is varied as shown by curve 48. Specifically, the reflection rate from the bar code sheet is lower than 50% in the region corresponding to the region 43' because the layer 41' of the ink 41 absorbs the visible light. In the region corresponding to the region 44, the reflection rate becomes approximately 100% because the layer 42' of the ink 42 reflects almost all visible light. In the region corresponding to the printing medium 40, the printing medium 40 absorbs almost all visible light, so that the reflection rate is lower than 50%.

When the bar code sheet is scanned along the line A–A' by a beam in the infrared range, the reflection rate from the bar code sheet is varied as shown by curve 47. Specifically, the reflection rate from the bar code sheet is approximately 100% in the region corresponding to the region 43', because the layer 41' of the ink 41 reflects almost all infrared rays. In the region corresponding to the region 45, the reflection rate becomes approximately 100% because the layer 42' of the ink 42 transmits the infrared rays and the layer 41' of the ink 41 reflects almost all infrared rays. In the region corresponding to the region 44', the reflection rate is lower than 50% because the layer 42' of the ink 42 transmits the infrared rays, and the printing medium 40 absorbs the infrared rays. In the region corresponding to the printing medium 40, the printing medium 40 absorbs the infrared rays, so that the reflection rate is lower than 50%.

As shown by dotted line in FIG. 12C, the case where the reflection rate from the bar code sheet is about 50% is set as a threshold value. In such a case, as the result of the scanning by the beam in the visible range, the region in which the reflection rate is higher than the threshold value is identified to be the bar code 2. As the result of the scanning by the beam in the infrared range, the region in which the reflection rate is higher than the threshold value is identified to be the bar code 1. In this way, the bar code 1 and the bar code 2 can be distinguished and identified.

According to the bar code sheet in this example, it is possible to print a plurality of bar codes in an overlapping manner, and to distinguishably read them. As a result, it is possible to print a larger amount of information in a prescribed region.

EXAMPLE 9

The bar code sheet in Example 8 necessitates that the ink 41 is printed under the ink 42. When the ink 41 and the ink 42 are printed in the reversed order, the bar code 1 and the bar code 2 cannot be identified.

Hereinafter, the bar code sheet in Example 9 according to the invention will be described with reference to FIGS. 13A to 13C.

Figures 13, 13B:
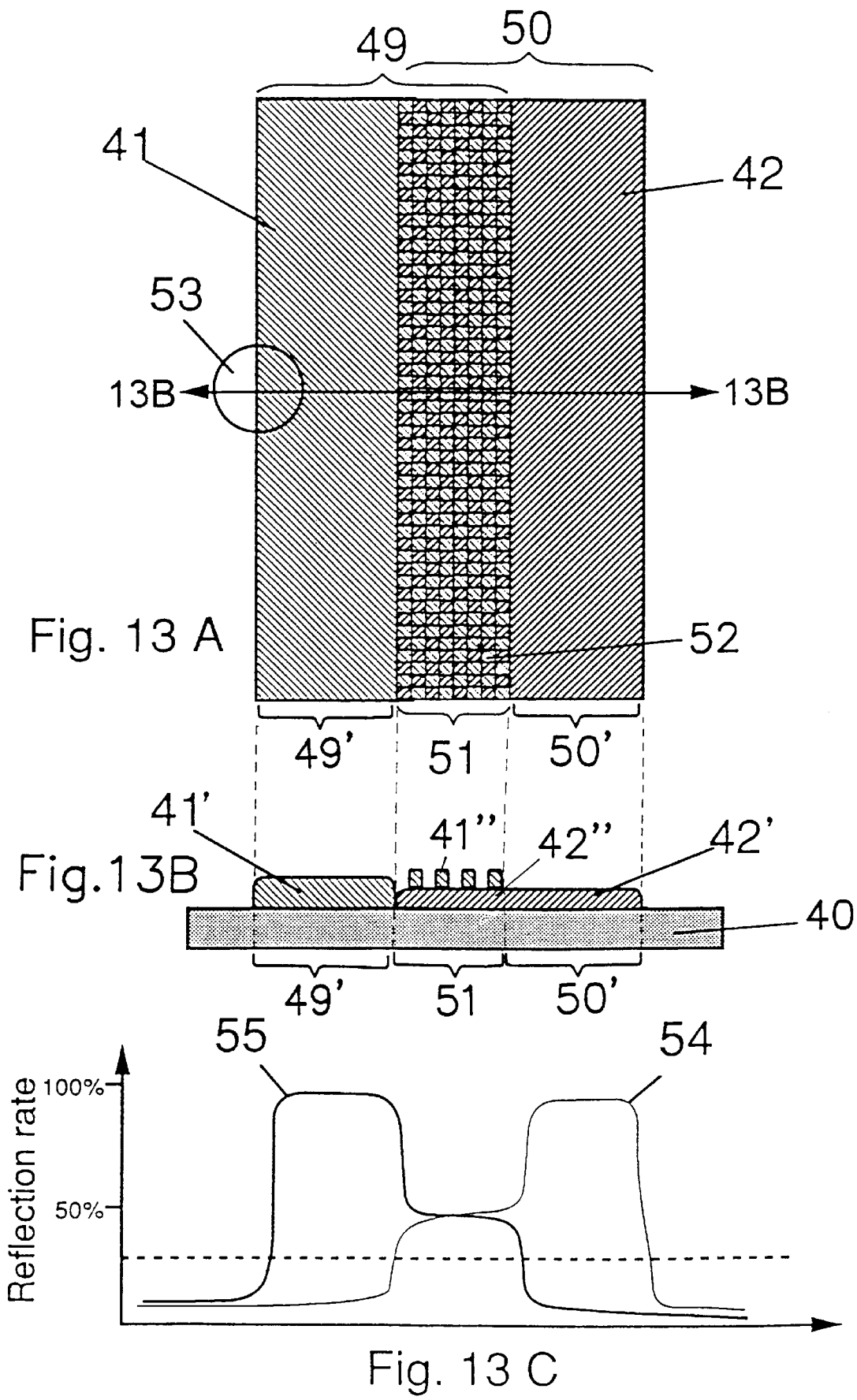

FIGS. 13A and 13B show the structure of the bar code sheet in Example 9 according to the invention. FIG. 13A is a plan view of the bar code sheet. A region 49 on a printing medium 40 is a region in which the bar code 1 is to be printed. A region 50 on the printing medium 40 is a region in which the bar code 2 is to be printed. A region 51 on the printing medium 40 is a region in which the bar code 1 and the bar code 2 are to be printed.

FIG. 13B is a cross-sectional view of the bar code sheet taken along the line A–A'. A region of the region 49 on the printing medium 40 except for the region 51 is designated by 49', and a region of the region 50 except for the region 51 is designated by 50'.

As shown in FIG. 13B, the bar code sheet includes the printing medium 40 having the absorption characteristics for visible light and infrared rays, a layer 41' of the ink 41 formed on the region 49' of the printing medium 40, a layer 42' of the ink 42 formed on the region 50' of the printing medium 40, and a layer 42" of the ink 42 formed on the region 51 of the printing medium 40. Both the layers 42' and 42" are formed of the ink 42, so that they can be a continuous single layer. The bar code sheet further has a layer 41" formed on the layer 42" corresponding to the region 51. The layer 41" is formed of the ink 41, and is formed so as not to cover at least a part of the layer 42". In this example, the layer 41" is divided into a plurality of minute portions, and the respective minute portions are arranged on the layer 42" in a checkered pattern in accordance with a pattern 52. In this way, the layer 41" of the ink 41 is discontinuously formed on the layer 42" of the ink 42, so that the layer 42" of the ink 42 is exposed between the gaps of the layer 41" of the ink 41. Accordingly, in the resultant bar code sheet, in the region 51 in which the bar code 1 and the bar code 2 are overlapped, the minute portions of the ink 41 and the minute portions of the ink 42 are alternately arranged.

A method for producing the bar code sheet having the above-described structure is the same as that describe in Example 1, so that the description thereof is omitted.

Next, a method for identifying the bar code 1 and the bar code 2 based on the distribution of rate of light reflected from the bar code sheet will be described.

FIG. 13C shows the distribution of rate of light reflected from the bar code sheet when a beam spot 53 is moved along the line A–A' shown in FIG. 13A. It is assumed that the size of the beam spot 53 is sufficiently larger than that of each of the minute portions of the layer 41".

When the bar code sheet is scanned by the beam in the visible range along the line A–A', the reflection rate from the bar code sheet is varied as shown by curve 54. Specifically, the reflection rate from the bar code sheet is about 10% in the region corresponding to the region 49' because the layer 41' of the ink 41 absorbs the visible light. In the region corresponding to the region 51, the reflection rate becomes approximately 50% which is the averaged rate for the ink 41 and the ink 42 due to the layer 42" of the ink 42 and the layer 41" of the ink 41. In the region corresponding to the region 50', the reflection rate becomes approximately 100% because the layer 42' of the ink 42 reflects almost all visible light. In the region corresponding to the printing medium 40, the printing medium 40 absorbs the visible light, so that the reflection rate is approximately 10%. In this specification, the reflection rate of about 10% may be replaced by the reflection rate equal to or less than 20%.

When the bar code sheet is scanned along the line A–A' by a beam in the infrared range, the reflection rate from the bar code sheet is varied as shown by curve 55. Specifically, the reflection rate from the bar code sheet is approximately 100% in the region corresponding to the region 49', because the layer 41' of the ink 41 reflects almost all infrared rays. In the region corresponding to the region 51, the reflection rate becomes approximately 50% which is the averaged rate for the ink 41 and the ink 42 due to the layer 42" of the ink 42 and the layer 41" of the ink 41. In the region corresponding to the region 50', the reflection rate is about 10%, because the layer 42' of the ink 42 transmits the infrared rays and the printing medium 40 absorbs the infrared rays. In the region corresponding to the printing medium 40, the printing medium 40 absorbs almost all infrared rays, so that the reflection rate is approximately 10%.

As shown by dotted line in FIG. 13C, the case where the reflection rate from the bar code sheet is about 30% is set as a threshold value. In such a case, as the result of the scanning by the beam in the visible range, the region in which the reflection rate is higher than the threshold value is identified to be the bar code 2. As the result of the scanning by the beam in the infrared range, the region in which the reflection rate is higher than the threshold value is identified to be the bar code 1. In this way, the bar code 1 and the bar code 2 can be distinguished and identified.

According to the bar code sheet in this example, it is possible to print a plurality of bar codes in an overlapping manner, and to distinguishably read them. As a result, it is possible to print a larger amount of information in a prescribed region. In addition, neither the ink 41 nor the ink 42 is required to have high transmittance rate for the light in the visible range. Accordingly, printing materials used for printing a plurality of bar codes in the overlapping manner can be more freely and desirably selected.

EXAMPLE 10

Hereinafter, a bar code sheet in Example 10 according to the invention will be described with reference to FIGS. 14A to 14C.

Figure 14:
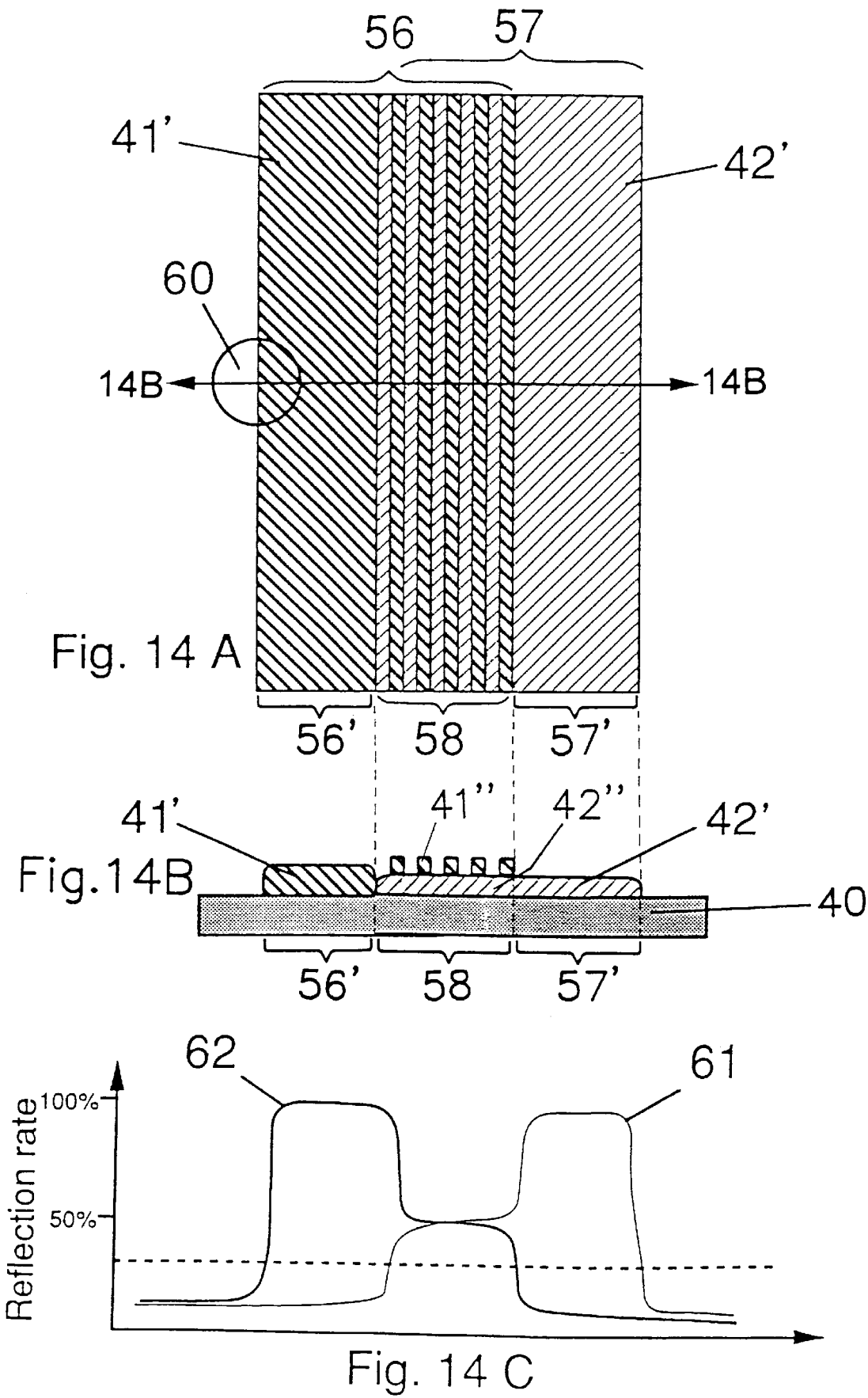
FIGS. 14A and 14B are diagrams showing the structure of a bar code sheet in Example 10 according to the invention.
FIG. 14C is a diagram showing the distribution of reflected light amount when the bar code sheet is scanned.

FIGS. 14A and 14B show the structure of the bar code sheet in Example 10 according to the invention. FIG. 14A is a plan view of the bar code sheet. A region 56 on a printing medium 40 is a region in which a bar code 1 is to be printed. A region 57 on the printing medium 40 is a region in which a bar code 2 is to be printed. A region 58 on the printing medium 40 is a region in which the bar code 1 and the bar code 2 are to be printed.

FIG. 14B is a cross-sectional view of the bar code sheet taken along the line A–A'. A region of the region 56 on the printing medium 40 except for the region 58 is designated by 56', and a region of the region 57 on the printing medium 40 except for the region 58 is designated by 57'.

As shown in FIG. 14B, the bar code sheet includes the printing medium 40 having the absorption characteristics for visible light and infrared rays, a layer 41' of the ink 41 formed on the region 56' of the printing medium 40, a layer 42' of the ink 42 formed on the region 57' of the printing medium 40, and a layer 42" of the ink 42 formed on the region 58 of the printing medium 40. Both the layers 42' and 42" are formed of the ink 42, so that they can be a continuous single layer. The bar code sheet further has a layer 41" formed on the layer 42" corresponding to the region 58. The layer 41" is formed of the ink 41, and is formed so as not to cover at least a part of the layer 42". In this example, the layer 41" is divided into a plurality of minute strip portions, and the respective minute strip portions are arranged on the layer 42" in accordance with a pattern 59. In this way, the layer 41" of the ink 41 is discontinuously formed on the layer 42" of the ink 42, so that the layer 42" of the ink 42 is exposed between the gaps of the layer 41" of the ink 41. Accordingly, in the resultant bar code sheet, in the region 58 in which the bar code 1 and the bar code 2 are overlapped, the minute portions of the ink 41 and the minute portions of the ink 42 are alternately arranged.

The method for producing the bar code sheet having the above-described structure is the same as that described in Example 2, so that the description thereof is omitted.

Next, a method for identifying the bar code 1 and the bar code 2 based on the distribution of rate of light reflected from the bar code sheet will be described.

FIG. 14C shows the distribution of rate of light reflected from the bar code sheet when a beam spot 60 is moved along the line A–A' shown in FIG. 14A. It is assumed that the size of the beam spot 60 is sufficiently larger than the width of each of the minute strip portions of the layer 41".

When the bar code sheet is scanned by the beam in the visible range along the line A–A', the reflection rate from the bar code sheet is varied as shown by curve 61. Specifically, the reflection rate from the bar code sheet is about 10% in the region corresponding to the region 56' because the layer 41' of the ink 41 absorbs the visible light. In the region corresponding to the region 58, the reflection rate becomes approximately 50% which is the averaged rate for the ink 41 and the ink 42 due to the layer 42" of the ink 42 and the layer 41" of the ink 41. In the region corresponding to the region 57', the reflection rate becomes approximately 100% because the layer 42' of the ink 42 reflects almost all visible light. In the region corresponding to the printing medium 40, the printing medium 40 absorbs the visible light, so that the reflection rate is approximately 10%.

When the bar code sheet is scanned along the line A–A' by a beam in the infrared range, the reflection rate from the bar code sheet is varied as shown by curve 62. Specifically, the reflection rate from the bar code sheet is approximately 100% in the region corresponding to the region 56', because the layer 41' of the ink 41 reflects almost all infrared rays. In the region corresponding to the region 58, the reflection rate becomes approximately 50% which is the averaged rate for the ink 41 and the ink 42 due to the layer 42" of the ink 42 and the layer 41" of the ink 41. In the region corresponding to the region 57', the reflection rate is about 10%, because the layer 42' of the ink 42 transmits the infrared rays, and the printing medium 40 absorbs the infrared rays. In the region corresponding to the printing medium 40, the printing medium 40 absorbs the infrared rays, so that the reflection rate is about 10%.

As shown by dotted line in FIG. 14C, the case where the reflection rate from the bar code sheet is about 30% is set as a threshold value. In such a case, as the result of the scanning by the beam in the visible range, the region in which the reflection rate from the bar code sheet is higher than the threshold value is identified as the bar code 2. As the result of the scanning by the beam in the infrared range, the region in which the reflection rate from the bar code sheet is higher than the threshold value is identified as the bar code 1. In this way, the bar code 1 and the bar code 2 can be distinguished and identified.

According to the bar code sheet in this example, it is possible to print a plurality of bar codes in an overlapping manner, and to distinguishably read them. As a result, it is possible to print a larger amount of information in a prescribed region. In addition, neither the ink 41 nor the ink 42 is required to have high transmittance rate for the light in the visible range. Accordingly, printing materials used for printing a plurality of bar codes in the overlapping manner can be more freely and desirably selected.

EXAMPLE 11

Hereinafter, a bar code sheet in Example 11 according to the invention will be described with reference to FIGS. 15A to 15C.

Figure 15:
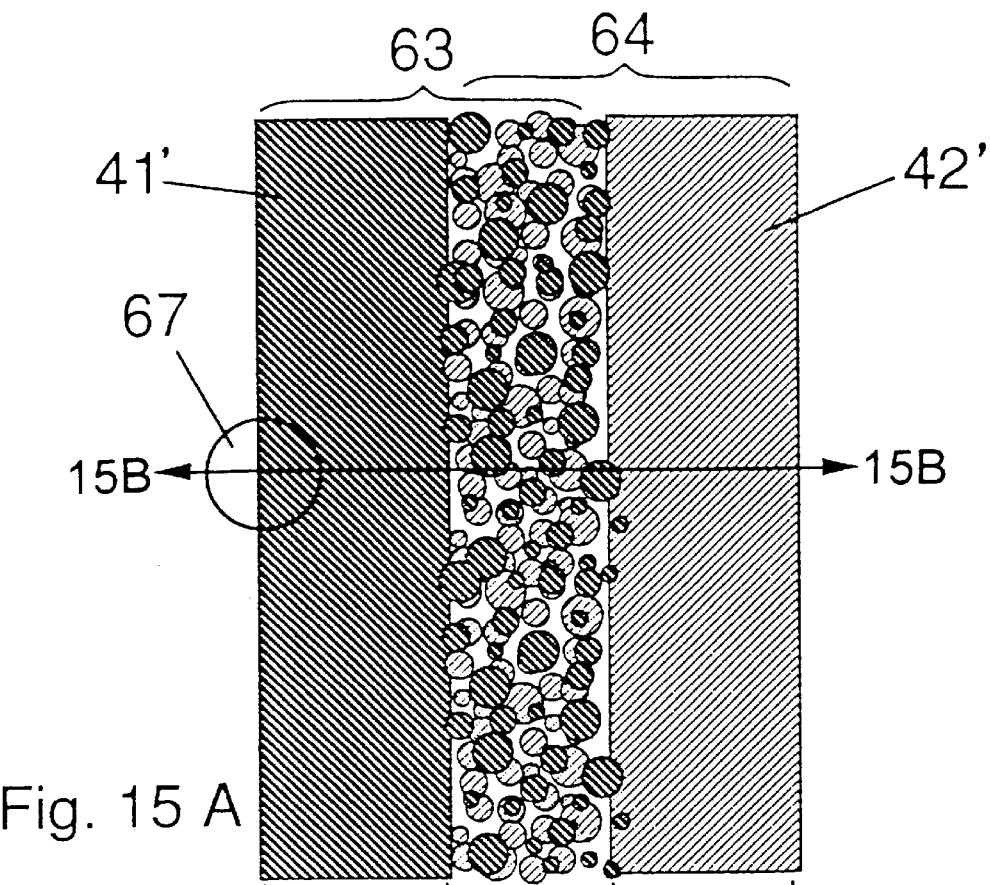
FIGS. 15A and 15B are diagrams showing the structure of a bar code sheet in Example 11 according to the invention.
FIG. 15C is a diagram showing the distribution of reflected light amount when the bar code sheet is scanned.
Figure 15B:
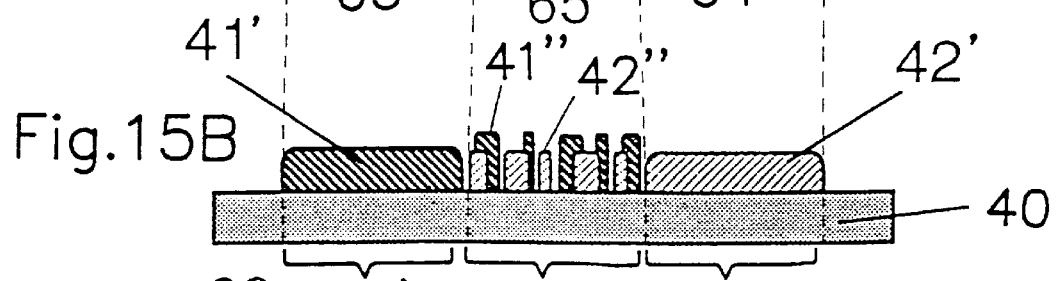
Figure 15:
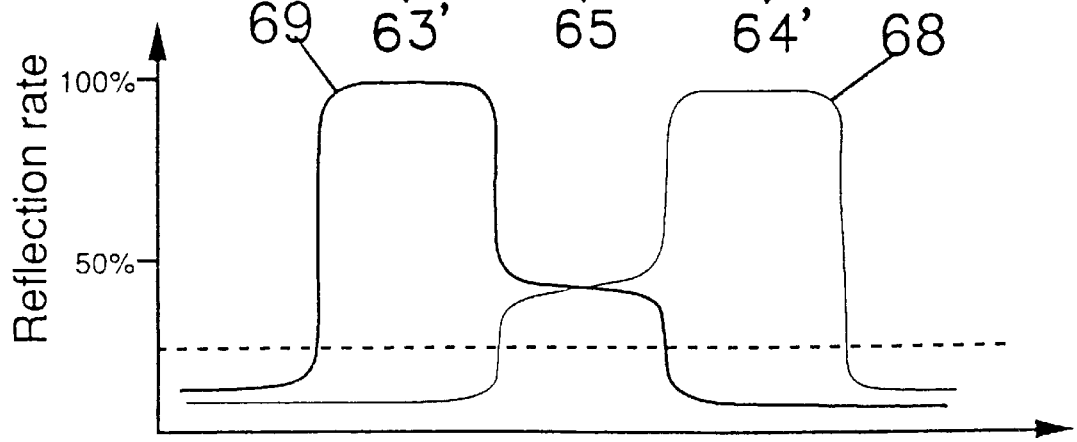

FIGS. 15A and 15B show the structure of the bar code sheet in Example 11 according to the invention. FIG. 15A is a plan view of the bar code sheet. A region 63 on a printing medium 40 is a region in which the bar code 1 is to be printed. A region 64 on the printing medium 40 is a region in which the bar code 2 is to be printed. A region 65 on the printing medium 40 is a region in which the bar code 1 and the bar code 2 are to be printed.

FIG. 15B is a cross-sectional view of the bar code sheet taken along the line A–A'. A region of the region 63 on the printing medium 40 except for the region 65 is designated by 63', and a region of the region 64 on the printing medium 40 except for the region 65 is designated by 64'.

As shown in FIG. 15B, the bar code sheet includes the printing medium 40 having the absorption characteristics for visible light and infrared rays, a layer 41' of the ink 41 formed on the region 63' of the printing medium 40, a layer 42' of the ink 42 formed on the region 64' of the printing medium 40, and a pattern 41" of the ink 41 and a pattern 42" of the ink 42 formed in the region 65 of the printing medium 40. The pattern 41" includes a plurality of circles arranged at random positions of the region 65. The circles have random minute radii, respectively. Also the pattern 42" includes a plurality of circles arranged at random positions of the region 65. The circles have random minute radii, respectively. When a circle of the pattern 41" and a circle of the pattern 42" are overlapped, the circle of the pattern 41" is formed on the circle of the pattern 42". Alternatively, the circle of the pattern 42" may be formed on the circle of the pattern 41". However, the pattern 41" does not cover the entire of the pattern 42", and the patterns 41" and 42" do not cover all of the region 65. The reason is that the sizes of the circles and the positions thereof are randomly determined. In this way, in the resultant bar code sheet, the circles of the ink 41 and the circles of the ink 42 are arranged as random dots in the region 65.

A method for producing the bar code sheet having the above-described structure is the same as that described in Example 3, so that the description thereof is omitted.

Next, a method for identifying the bar code 1 and the bar code 2 based on the distribution of rate of light reflected from the bar code sheet will be described.

FIG. 15C shows the distribution of rate of light reflected from the bar code sheet when a beam spot 67 is moved along the line A–A' shown in FIG. 15A. It is assumed that the size of the beam spot 67 is sufficiently larger than that of the largest circle included in the patterns 41" and 42".

When the bar code sheet is scanned by the beam in the visible range along the line A–A', the reflection rate from the bar code sheet is varied as shown by curve 68. Specifically, the reflection rate from the bar code sheet is about 10% in the region corresponding to the region 63' because the layer 41' of the ink 41 absorbs the visible light. In the region corresponding to the region 65, the reflection rate becomes approximately 40% which is the averaged rate for the ink 41, the ink 42, and the printing medium 40 due to the pattern 42" of the ink 42 and the pattern 41" of the ink 41. In the region corresponding to the region 64', the reflection rate becomes approximately 100% because the layer 42' of the ink 42 reflects almost all visible light. In the region corresponding to the printing medium 40, the printing medium 40 absorbs the visible light, so that the reflection rate is about 10%.

When the bar code sheet is scanned along the line A–A' by a beam in the infrared range, the reflection rate from the bar code sheet is varied as shown by curve 69. Specifically, the reflection rate from the bar code sheet is approximately 100% in the region corresponding to the region 63', because the layer 41' of the ink 41 reflects almost all infrared rays. In the region corresponding to the region 65, the reflection rate becomes approximately 40% which is the averaged rate for the ink 41, the ink 42, and the printing medium 40 due to the pattern 42" of the ink 42 and the pattern 41" of the ink 41. In the region corresponding to the region 64', the reflection rate is about 10%, because the layer 42' of the ink 42 transmits the infrared rays and the printing medium 40 absorbs the infrared rays. In the region corresponding to the printing medium 40, the printing medium 40 absorbs the infrared rays, so that the reflection rate is approximately 10%.

As shown by dotted line in FIG. 15C, the case where the reflection rate from the bar code sheet is about 25% is set as a threshold value. In such a case, as the result of the scanning by the beam in the visible range, the region in which the reflection rate from the bar code sheet is higher than the threshold value is identified to be the bar code 2. As the result of the scanning by the beam in the infrared range, the region in which the reflection rate from the bar code sheet is higher than the threshold value is identified to be the bar code 1. In this way, the bar code 1 and the bar code 2 can be distinguished and identified.

According to the bar code sheet in this example, it is possible to print a plurality of bar codes in an overlapping manner, and to distinguishably read them. As a result, it is possible to print a larger amount of information in a prescribed region. In addition, neither the ink 41 nor the ink 42 is required to have high transmittance rate for the light in the visible range. Accordingly, printing materials used for printing a plurality of bar codes in the overlapping manner can be more freely and desirably selected. Moreover, it is sufficient that the circles of the pattern 41" and the circles of the pattern 42" are arranged randomly on the region 65, so that precise positioning is not required.

EXAMPLE 12

Hereinafter, a bar code sheet in Example 12 according to the invention will be described.

Figure 16:
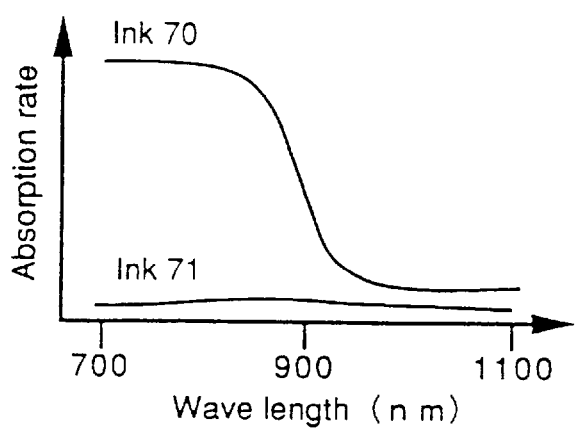
FIGS. 16A to 16C are diagrams showing the wavelength characteristics (absorption rate, transmittance rate, and reflection rate) of ink.
Figure 16:
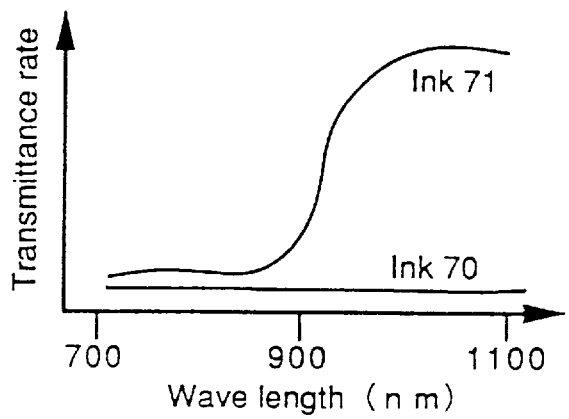
Figure 16:
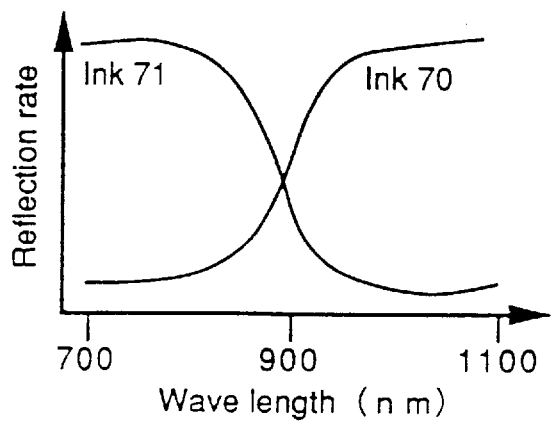

FIG. 16A shows the relationship between the wavelength band and the absorption rate for ink 70 and ink 71. FIG. 16B shows the relationship between the wavelength band and the transmittance rate for the ink 70 and the ink 71. FIG. 16C shows the relationship between the wavelength band and the reflection rate for the ink 70 and the ink 71. The ink 70 exhibits the absorption characteristic in a first infrared range from 700 nm to 900 nm (FIG. 16A), and exhibits the reflection characteristic in a second infrared range from 900 nm to 1100 nm (FIG. 16C). The ink 71 exhibits the reflection characteristic in the first infrared range (FIG. 16C), and exhibits the transmission characteristic in the second infrared range (FIG. 16B). The ink 70 always has a lower transmittance rate irrespective of the wavelengths. The ink 71 always has a lower absorption rate irrespective of the wavelengths. As a result, the absorption rate of the ink 70 is higher than the absorption rate of the ink 71 in the first infrared range, and the transmittance rate of the ink 71 is higher than the transmittance rate of the ink 70 in the second infrared range. In addition, the reflection rate of the ink 71 is higher than the reflection rate of the ink 70 in the first infrared range, and the reflection rate of the ink 70 is higher than the reflection rate of the ink 71 in the second infrared range.

By using the ink 70 and the ink 71 having the above-described wavelength characteristics, a bar code sheet having the same structure as that of any one of Examples 8 to 11 can be obtained. As the read light for reading the bar code, infrared rays having a wavelength of 800 nm, and infrared rays having a wavelength of 1000 nm are used. The distribution of reflection rate of light reflected from the bar code sheet is similar to those in Examples 8 to 11.

Therefore, even when the ink 70 and the ink 71 are used, the same effects as those in Examples 8 to 11 can be obtained. In addition, when the ink 70 and the ink 71 have transmission characteristics in the visible range, the bar codes printed with the ink 70 and the ink 71 are transparent to the human eye. For example, when a bar code is printed on a commodity product, the appearance of the product is not degraded.

EXAMPLE 13

Next, a bar code sheet in Example 13 according to the invention will be described.

In Examples 6 to 12 described above, the present invention is applied to one-dimensional bar codes. However, the present invention is not limited to such one-dimensional types. It is possible to apply the present invention to two-dimensional bar codes.

FIG. 7 shows an exemplary two-dimensional bar code. The two-dimensional bar code is obtained by combining minimum patterns 200. For example, whether the minimum patterns 200 exist at predetermined positions or not is detected by a two-dimensional CCD device, so that the two-dimensional bar code can be read.

Similar to Examples 6 through 12, a first ink layer is discontinuously formed on a second ink layer in a region in which a plurality of two-dimensional bar codes are overlapped, and the second ink layer is exposed through gaps of the first ink layer, so that a plurality of two-dimensional bar codes can be printed in an overlapping manner, and they can be appropriately read.

EXAMPLE 14

Figure 17:
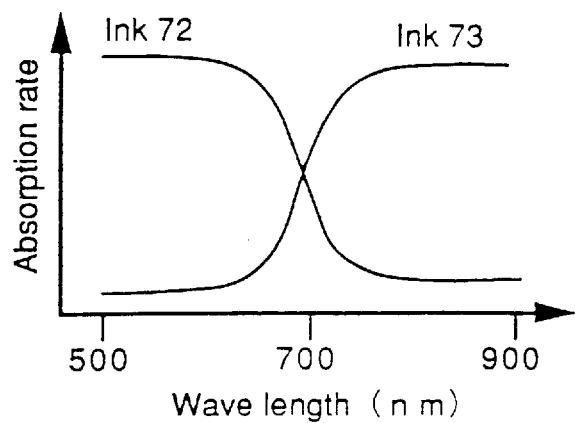
FIGS. 17A and 17B are diagrams showing the wavelength characteristics (absorption rate and transmittance rate) of ink.
Figure 17:
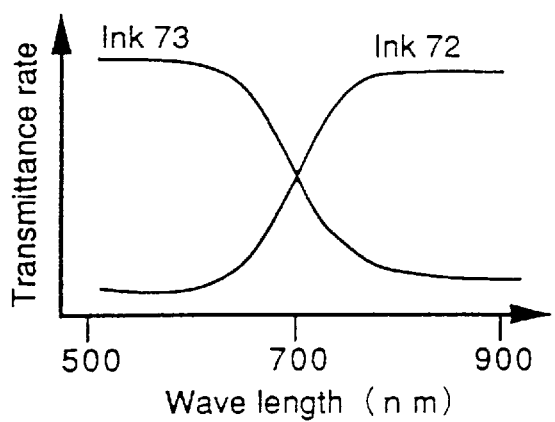

FIG. 17A shows the relationship between the wavelength band and the absorption rate for ink 72 and ink 73. FIG. 17B shows the relationship between the wavelength band and the transmittance rate for the ink 72 and the ink 73. The ink 72 exhibits the absorption characteristic in the so-called visible range from 500 nm to 700 nm (FIG. 17A), and exhibits the transmission characteristic in the infrared range from 700 nm to 900 nm (FIG. 17B). The ink 73 exhibits the transmission characteristic in the visible range (FIG. 17B), and exhibits the absorption characteristic in the infrared range (FIG. 17A). As a result, the absorption rate of the ink 72 is higher than the absorption rate of the ink 73 in the visible range, and the absorption rate of the ink 73 is higher than the absorption rate of the ink 72 in the infrared range. In addition, the transmittance rate of the ink 73 is higher than the transmittance rate of the ink 72 in the visible range, and the transmittance rate of the ink 72 is higher than the transmittance rate of the ink 73 in the infrared range.

The ink 72 is used for printing a bar code 1 and the ink 73 is used for printing a bar code 2. Therefore, in the case where the region in which the bar code 1 is to be printed and the region in which the bar code 2 is to be printed are not overlapped, it is possible to independently read the bar code 1 and the bar code 2 by utilizing the wavelength characteristics of the ink 72 and the ink 73. For example, the bar code 2 can be read by scanning the bar code sheet with a semiconductor laser which emits visible light having a wavelength of 635 nm. The bar code 1 can be read by scanning the bar code sheet with a semiconductor laser which emits infrared rays having a wavelength of 830 nm.

Hereinafter, the bar code sheet in Example 14 according to the invention will be described with reference to FIGS. 18A to 18C.

Figure 18:
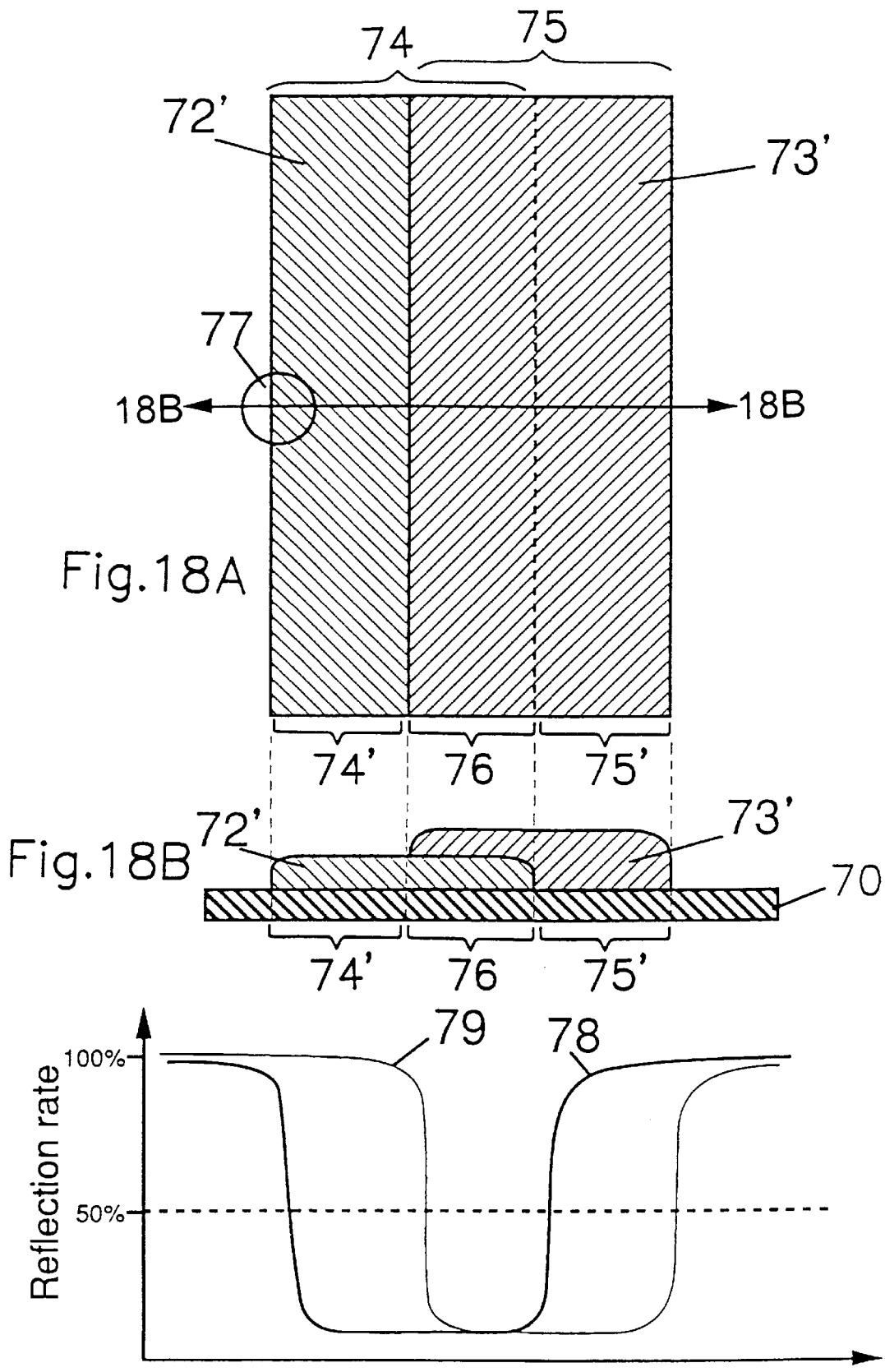
FIGS. 18A and 18B are diagrams showing the structure of a bar code sheet in Example 14 according to the invention.
FIG. 18C is a diagram showing the distribution of reflected light amount when the bar code sheet is scanned.

FIGS. 18A and 18B show the structure of the bar code sheet in Example 14 according to the invention. FIG. 18A is a plan view of the bar code sheet. A region 74 on a printing medium 70 is a region in which the bar code 1 is to be printed. A region 75 on the printing medium 70 is a region in which the bar code 2 is to be printed. A region 76 on the printing medium 70 is a region in which the bar code 1 and the bar code 2 are to be printed.

FIG. 18B is a cross-sectional view of the bar code sheet taken along the line A–A'. As shown in FIG. 18B, the bar code sheet includes the printing medium 70 having the reflection characteristics for visible light and infrared rays, a layer 72' of the ink 72 formed on the region 74 of the printing medium 70, a layer 73' of the ink 73 formed on the region 75 so as to cover a part of the layer 72'.

Next, a method for identifying the bar code 1 and the bar code 2 based on the distribution of reflection rate of light reflected from the bar code sheet will be described. A region of the region 74 of the printing medium 70 except for the region 76 is designated by 74', and a region of the region 75 of the printing medium 70 except for the region 76 is designated by 75'.

FIG. 18C shows the distribution of reflection rate of light reflected from the bar code sheet when a beam spot 77 is moved along the line A–A' shown in FIG. 18A.

When the bar code sheet is scanned by the beam in the visible range along the line A–A', the reflection rate from the bar code sheet is varied as shown by curve 78. Specifically, the reflection rate from the bar code sheet is about 10% in the region corresponding to the region 74' because the layer 72' of the ink 72 absorbs the visible light. In the region corresponding to the region 76, the reflection rate is about 10% because the layer 73' of the ink 73 transmits the visible light and the layer 72' of the ink 72 absorbs the visible light. In the region corresponding to the region 75', the reflection rate becomes approximately 100% because the layer 73' of the ink 73 transmits the visible light and the printing medium 70 reflects almost all the visible light. In the region corresponding to the printing medium 70, the printing medium 70 reflects almost all visible light, so that the reflection rate is approximately 100%.

When the bar code sheet is scanned along the line A–A' by a beam in the infrared range, the reflection rate from the bar code sheet is varied as shown by curve 79. Specifically, the reflection rate from the bar code sheet is approximately 100% in the region corresponding to the region 74', because the layer 72' of the ink 72 transmits the infrared rays and the printing medium 70 reflects almost all the infrared rays. In the region corresponding to the region 76, the reflection rate becomes approximately 10% because the layer 73' of the ink 73 absorbs the infrared rays. In the region corresponding to the region 75', the reflection rate is about 10% because the layer 73' of the ink 73 absorbs the infrared rays. In the region corresponding to the printing medium 70, the printing medium 70 reflects almost all of the infrared rays, so that the reflection rate becomes approximately 100%.

As shown by dotted line in FIG. 18C, the case where the reflection rate from the bar code sheet is about 50% is set as a threshold value. In such a case, as the result of the scanning by the beam in the visible range, the region in which the reflection rate from the bar code sheet is lower than the threshold value is identified to be the bar code 1. As the result of the scanning by the beam in the infrared range, the region in which the reflection rate from the bar code sheet is lower than the threshold value is identified to be the bar code 2. In this way, the bar code 1 and the bar code 2 can be distinguished and identified.

In this example, the layer 73' of the ink 73 is formed so as to cover a part of the layer 72' of the ink 72. Alternatively, the layer 72' may be formed on the layer 73'. In the case where the layer 72' of the ink 72 is formed so as to cover a part of the layer 73' of the ink 73, it is possible to distinguish the bar code 1 from the bar code 2 in the same way as described above.

According to the bar code sheet in this example, it is possible to print a plurality of bar codes in an overlapping manner, and to distinguishably read them. As a result, it is possible to print a larger amount of information in a prescribed region. In addition, when the ink 72 and the ink 73 are printed in the overlapping manner, it is possible to obtain a bar code sheet having the desired wavelength characteristics irrespective of the superposing order of the ink 72 and the ink 73.

EXAMPLE 15

Hereinafter, a bar code sheet in Example 15 according to the invention will be described.

Figure 19:
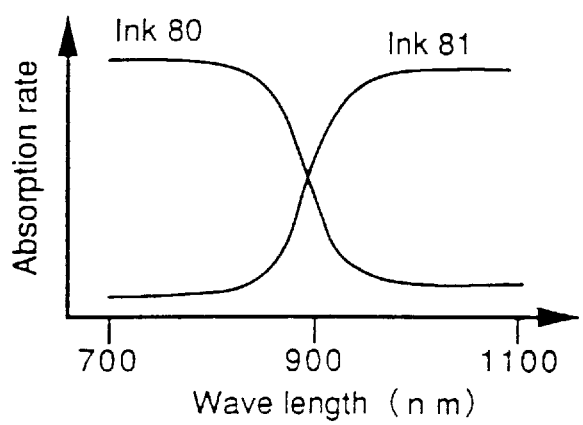
FIGS. 19A and 19B are diagrams showing the wavelength characteristics (absorption rate and transmittance rate) of ink.
Figure 19:
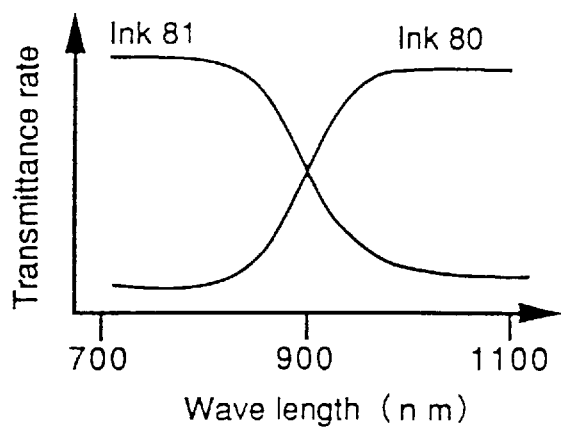

FIG. 19A shows the relationship between the wavelength band and the absorption rate for ink 80 and ink 81. FIG. 19B shows the relationship between the wavelength band and the transmittance rate for the ink 80 and the ink 81. The ink 80 exhibits the absorption characteristic in a first infrared range from 700 nm to 900 nm (FIG. 19A), and exhibits the transmission characteristic in a second infrared range from 900 nm to 1100 nm (FIG. 19B). The ink 81 exhibits the transmission characteristic in the first infrared range (FIG. 19B), and exhibits the absorption characteristic in the second infrared range (FIG. 19A). As a result, the absorption rate of the ink 80 is higher than the absorption rate of the ink 81 in the first infrared range, and the absorption rate of the ink 81 is higher than the absorption rate of the ink 80 in the second infrared range. In addition, the transmittance rate of the ink 81 is higher than the transmittance rate of the ink 80 in the first infrared range, and the transmittance rate of the ink 80 is higher than the transmittance rate of the ink 81 in the second infrared range.

By using the ink 80 and the ink 81 having the above-described wavelength characteristics, a bar code sheet having the same structure as that of Example 14 can be obtained. As the read light for reading the bar code, infrared rays having a wavelength of 800 nm, and infrared rays having a wavelength of 1000 nm are used. The distribution of reflection rate of light reflected from the bar code sheet is similar to that in Example 14.

Therefore, even when the ink 80 and the ink 81 are used, the same effects as those in Example 14 can be obtained. In addition, when the ink 80 and the ink 81 have transmission characteristics in the visible range, the bar codes printed with the ink 80 and the ink 81 are transparent to the human eye. For example, when a bar code is printed on a commodity product, the appearance of the product is not degraded.

EXAMPLE 16

Next, a bar code sheet in Example 16 according to the invention will be described.

In Examples 14 and 15 described above, the present invention is applied to one-dimensional bar codes. However, the present invention is not limited to such one-dimensional types. It is possible to apply the present invention to two-dimensional bar codes.

FIG. 7 shows an exemplary two-dimensional bar code. The two-dimensional bar code is obtained by combining minimum patterns 200. For example, whether the minimum patterns 200 exist at predetermined positions or not is detected by a two-dimensional CCD device, so that the two-dimensional bar code can be read.

Similar to Examples 14 and 15, a first ink layer is discontinuously formed on a second ink layer in a region in which a plurality of two-dimensional bar codes are overlapped, and the second ink layer is exposed through gaps of the first ink layer, so that a plurality of two-dimensional bar codes can be printed in an overlapping manner, and they can be appropriately read.

EXAMPLE 17

Hereinafter, a reading device for reading a bar code from a bar code sheet according to the invention will be described.

Figure 20:
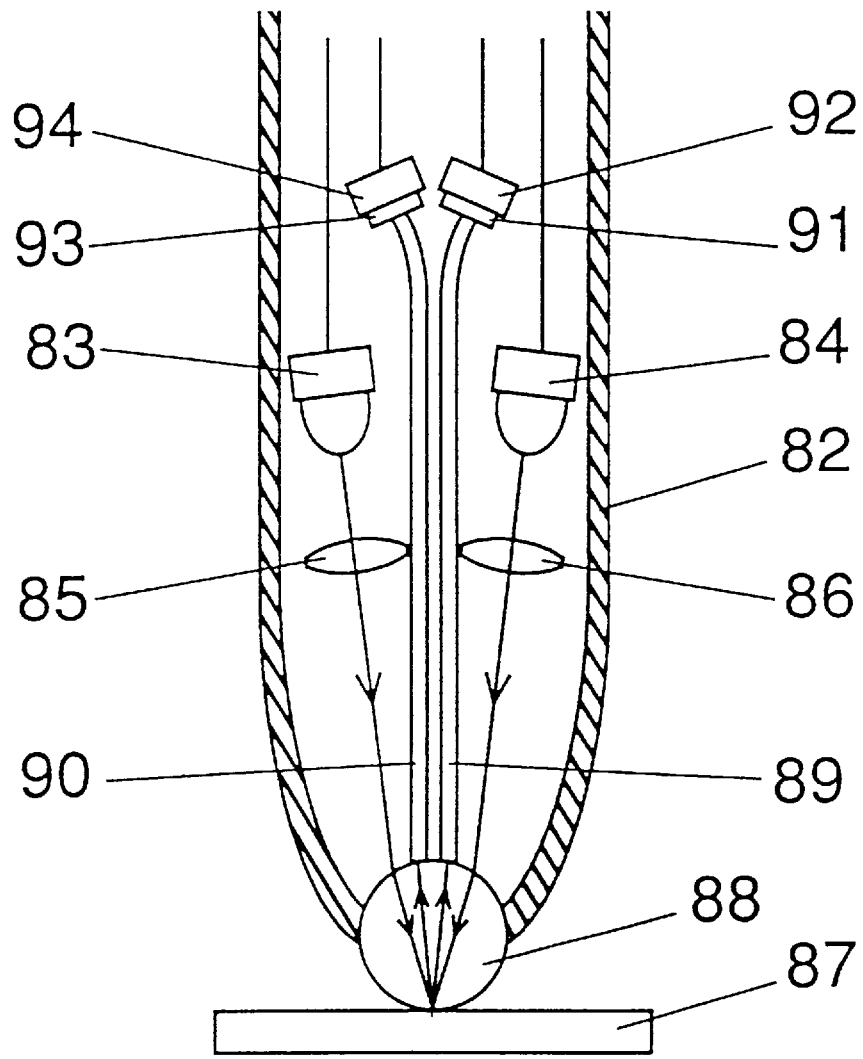
FIG. 20 is a diagram showing the construction of a reader for reading a bar code sheet according to the invention.

FIG. 20 shows the construction of the reading device. The reading device is provided with a case 82 which is held by the hand of an operator. In the case 82, a light emitting diode (LED) 83 for emitting visible light, a light emitting diode (LED) 84 for emitting infrared rays, a collimator lens 85 for allowing the visible light emitted from the LED 83 to be parallel light, a collimator lens 86 for allowing the infrared rays emitted from the LED 84 to be parallel light, and a spherical objective lens 88 for converging the light from the collimator lens 85 and the light from the collimator lens 86 on a bar code sheet 87. In addition, in the case 82, fibers 89 and 90 for taking in the light reflected from the bar code sheet 87, a filter 91 for allowing only the visible light to pass, a photodetector 92, a filter 93 for allowing only the infrared rays to pass, and a photodetector 94.

The operator holds the case 82 of the reading device, and scans the bar code sheet 87. While the reading device scans the bar code sheet 87, the LED 83 and the LED 84 emit respective light. The visible light from the LED 83 and the infrared rays from the LED 84 are substantially collimated by the collimator lenses 85 and 86, respectively. Thereafter, the collimated light is converged on the bar code sheet 87 by the objective lens 88.

The light reflected from the bar code sheet 87 is again converged by the objective lens 88, and a part of the converged light is incident on the filters 91 and 92 through the fibers 89 and 90, respectively. The filter 91 allows only the visible light of the incident light to pass. As a result, only the visible light of the reflected light from the bar code sheet 87 is detected by the photodetector 92. The photodetector 92 converts the visible light into an electric signal. The filter 93 allows only the infrared rays of the incident light to pass. As a result, only the infrared rays of the reflected light from the bar code sheet 87 are detected by the photodetector 94. The photodetector 94 converts the infrared rays into an electric signal.

The output of the photodetector 92 and the output of the photodetector 94 are connected to an identifying circuit (not shown) via an appropriate wave shaping circuit (not shown). The identifying circuit compares the output of the photodetector 92 and the output of the photodetector 94 with a predetermined threshold value. The predetermined threshold value is previously set based on the wavelength characteristics of a first ink and a second ink used for printing the bar code 1 and the bar code 2 and the wavelength characteristic of a printing medium, as described in Examples 1 to 16. On the basis of the output of the identifying circuit, the bar code 1 and the bar code 2 are identified.

In this example, the visible light and the infrared rays are emitted from the light source. Alternatively, two light sources which emit infrared rays having respective wavelengths that are different from each other may be used. In the case where a two-dimensional bar code is to be read, a two-dimensional CCD is used instead of the fibers and the photodiodes, whereby the two-dimensional information can be obtained at one time.

EXAMPLE 18

In Examples 1, 2, 9, and 10, the first layer formed of the first ink is divided into a plurality of minute portions, and the plurality of minute portions are arranged on the second layer formed of the second ink, in a checkered pattern or a striped pattern in accordance with a prescribed pattern. However, the structure of the bar code sheet of the invention is not limited to such specific patterns. In the case where a certain section is formed on a region in which the region for the bar code 1 and the region for the bar code 2 are overlapped, the section can have any desired shape insofar as the reflection rate in the section is substantially equal to the averaged reflection rate for the first ink and the second ink.

Figure 22:
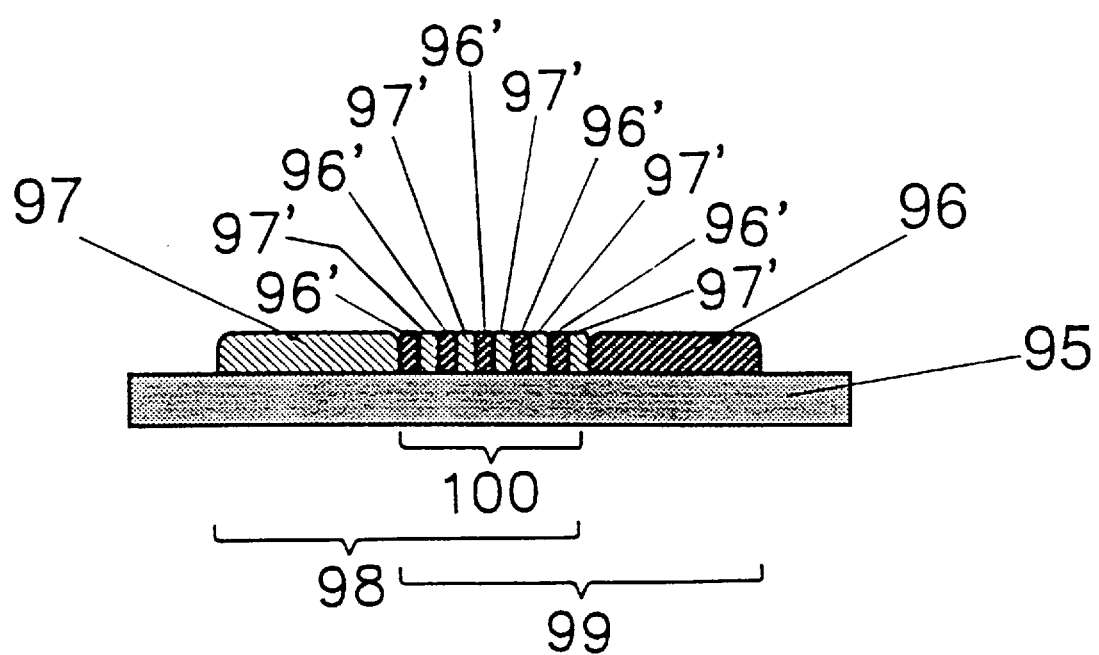
FIG. 22 is a diagram showing the structure of a bar code sheet in Example 18 according to the invention.

FIG. 22 shows the structure of a bar code sheet in Example 18 according to the invention. A region 98 on a printing medium 95 is a region in which the bar code 1 is to be printed. A region 99 on the printing medium 95 is a region in which the bar code 2 is to be printed. A region 100 on the printing medium 95 is a region in which the bar code 1 and the bar code 2 are printed. In this example, the region 100 is completely covered with a layer 97' of a first ink and a layer 96' of a second ink. The layer 97' of the first ink is divided into a plurality of minute portions, and the plurality of minute portions are arranged on the region 100 in accordance with a first predetermined pattern. The layer 96' of the second ink is divided into a plurality of minute portions, and the plurality of minute portions are arranged on the region 100 in accordance with a second predetermined pattern which is complementary with respect to the first predetermined pattern. The first predetermined pattern is, for example, a checkered pattern, a striped pattern, or the like.

By the layer 97' and the layer 96' formed in the above-described manner, the reflection rate of the section formed in the region 100 is made to be equal to the averaged reflection rate of the first ink and the second ink. Therefore, by the same method as that used in Examples 1, 2, 9, and 10, the bar code 1 and the bar code 2 can be identified.

In Example 1 or 9, the shape of each minute portion in the checkered pattern is square. It is appreciated that each minute portion can have any desired shape such as rectangle, circle, rhombus. In a region in which the region for the bar code 1 and the region for the bar code 2 are overlapped, it is unnecessary to print the bar code 1 and the bar code 2 so as not to completely overlap the layer of the first ink and the layer of the second ink. In the overlapping region, the bar code 1 and the bar code 2 may be printed so that a part of the layer of the first ink and a part of the layer of the second ink are overlapped. For example, the layer of the first ink is formed on the entire surface, and then the layer of the second ink is formed on the layer of the first ink in a checkered pattern.

In Example 2 or 10, the striped pattern is printed so that each stripe extends perpendicular to the scanning direction for the one-dimensional bar code. However, if the width of each stripe is sufficiently smaller than the size of the reading light beam, the striped pattern may be parallel or diagonal with respect to the scanning direction for the one-dimensional bar code. In addition, the layer of the first ink is formed on the entire surface, and then the layer of the second ink may by formed on the layer of the first ink in a striped pattern.

In Example 3 or 11, both of the circles of the first ink and the circles of the second ink are not necessarily arranged in a random dot manner. For example, the layer of the first ink is formed on the entire surface, and then the random dot pattern of the second ink may be printed.

In all of the examples described above, the printing medium is required to have a reflection characteristic or an absorption characteristic. However, whichever wavelength characteristic the printing medium has, any type of ink having a desired wavelength characteristic is printed on the entire surface of the printing medium, so that the same effects as those described in the above examples can be attained.

Moreover, in all of the examples described above, two types of ink having different characteristics are used. However, the present invention is not limited to the use of two types of ink. If three or more types of ink are used and different characteristics in three or more wavelength bands are provided, multiple kinds of code information can also be recorded. Furthermore, the present invention is applicable to any type of code information, in addition to the bar code.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A code sheet representing first code information and second code information, the code sheet comprising:
   a printing medium including a first region in which the first code information is to be printed, a second region in which the second code information is to be printed, and a third region in which the first code information and the second code information are to be printed;
   a first section formed on a region of the first region of the printing medium excluding the third region, the first section being made of a first printing material;
   a second section formed on a region of the second region of the printing medium excluding the third region, the second section being made of a second printing material different from the first printing material; and
   a third section formed only on the third region of the printing medium, the third section including a portion made of the first printing material and a portion made of the second printing material;
   wherein a reflection rate of the third section is substantially equal to a reflection rate obtained by averaging a reflection rate of the first printing material and a reflection rate of the second printing material with respect to light in a first wavelength band and light in a second wavelength band,
   and wherein the first second and third regions are separate and distinct.

2. A code sheet according to claim 1, wherein:
   the printing medium has a reflection characteristic for the light in the first wavelength band and the light in the second wavelength band;
   the first printing material has an absorption rate for the light in the first wavelength band, which is higher than that of the second printing material, and has a reflection rate for the light in the second wavelength band, which is higher than that of the second printing material; and
   the second printing material has a reflection rate of the light in the first wavelength band, which is higher than that of the first printing material, and has an absorption rate for the light in the second wavelength band, which is higher than that of the first printing material.

3. A code sheet according to claim 2, wherein the printing medium reflects substantially all light in the first wavelength band and in the second wavelength band.

4. A code sheet according to claim 1, wherein:
   the printing medium has an absorption characteristic for the light in the first wavelength band and the light in the second wavelength band;
   the first printing material has an absorption rate for the light in the first wavelength band, which is higher than that of the second printing material, and has a reflection rate for the light in the second wavelength band, which is higher than that of the second printing material; and
   the second printing material has a reflection rate of the light in the first wavelength band, which is higher than that of the first printing material, and has a transmittance rate for the light in the second wavelength band, which is higher than that of the first printing material.

5. A code sheet according to claim 4, wherein the printing medium absorbs substantially all light in the first wavelength band and in the second wavelength band.

6. A code sheet according to claim 1, wherein the third section includes:
   a first layer formed on the third region of the printing medium, the first layer being made of the second printing material; and
   a second layer formed on the first layer, the second layer being made of the first printing material,
   at least a part of the first layer not being covered with the second layer.

7. A code sheet according to claim 6, wherein the second layer is formed in a checkered pattern on the first layer.

8. A code sheet according to claim 6, wherein the second layer is formed in a striped pattern on the first layer.

9. A code sheet according to claim 6, wherein said first printing material in said first region and said second printing material in said second and third regions are applied directly on top of a single planar surface of the printing material.

10. A code sheet according to claim 9, wherein said first layer completely covers the third region of the printing medium and said second layer partially covers the first layer.

11. A code sheet according to claim 1, wherein the third section includes:
    a first pattern formed on the third region of the printing medium, the first pattern being made of the first printing material; and
    a second pattern formed on the third region of the printing medium, the second pattern being made of the second printing material,
    each of the first pattern and the second pattern having a random size, and being arranged at a random position on the third region of the printing medium.

12. A code sheet according to claim 11, wherein said second printing material in said second and third regions and said first printing material in said first and third regions are applied directly on top of a single planar surface of the printing material.

13. A code sheet according to claim 1, wherein the light in the first wavelength band is visible light, and the light in the second wavelength band is infrared rays.

14. A code sheet according to claim 1, wherein the light in the first wavelength band is first infrared rays, and the light in the second wavelength band is second infrared rays.

15. A code sheet according to claim 1, wherein each of the first code information and the second code information is one-dimensional code information.

16. A code sheet according to claim 1, wherein each of the first code information and the second code information is two-dimensional code information.

17. A code sheet according to claim 16, wherein:
said third region is a rectangular array having a plurality of respectively different parallel rows, each row including a plurality of rectangular areas;
at least one of the rectangular areas is a first area having the first printing material as a top layer thereon;
at least one of the rectangular areas is a second area having the second printing material as a top layer thereon; and
each of the rows defines a respectively different sequence of first areas and second areas.

18. A code sheet according to claim 17, wherein the rectangular array has an assymetrical two dimensional pattern of first and second areas therein.

19. A code sheet representing first code information and second code information, the code sheet comprising:
a printing medium having an absorption characteristic for light in a first wavelength band and light in a second wavelength band, the printing medium including a first region in which the first code information is to be printed, a second region in which the second code information is to be printed and a third region in which both the first code information and the second code information are to be printed;
a first layer formed on the first region of the printing medium, the first layer being made of a first printing material; and
a second layer formed on the second region of the printing medium, and to cover a part of the first layer only on the third region, the second layer being made of second printing material different from the first printing material,
and wherein the first, second and third regions are separate and distinct.

20. A code sheet according to claim 19, wherein:
the first printing material has a transmittance rate for the light in the first wavelength band, which is higher than that of the second printing material, and has a reflection rate for the light in the second wavelength band, which is higher than that of the second printing material; and
the second printing material has a reflection rate for the light in the first wavelength band, which is higher than that of the first printing material, and has a transmittance rate for the light in the second wavelength band, which is higher than that of the first printing material.

21. A code sheet according to claim 19, wherein:
the first printing material has an absorption rate for the light in the first wavelength band, which is higher than that of the second printing material, and has a reflection rate for the light in the second wavelength band, which is higher than that of the second printing material; and
the second printing material has a reflection rate for the light in the first wavelength band, which is higher than that of the first printing material, and has a transmittance rate for the light in the second wavelength band, which is higher than that of the first printing material.

22. A code sheet according to claim 19, wherein:
the first printing material has an absorption rate for the light in the first wavelength band, which is higher than that of the second printing material, and has a transmittance rate for the light in the second wavelength band, which is higher than that of the second printing material; and
the second printing material has a transmittance rate for the light in the first wavelength band, which is higher than that of the first printing material, and has an absorption rate for the light in the second wavelength band, which is higher than that of the first printing material.

23. A code sheet according to claim 19, wherein the light in the first wavelength band is visible light, and the light in the second wavelength band is infrared rays.

24. A code sheet according to claim 19, wherein the light in the first wavelength band is first infrared rays, and the light in the second wavelength band is second infrared rays.

25. A code sheet according to claim 19, wherein each of the first code information and the second code information is one-dimensional code information.

26. A code sheet according to claim 19, wherein each of the first code information and the second code information is two-dimensional code information.

27. A method for producing a code sheet on which first code information and second code information are printed, the method comprising the steps of:
detecting a first distinct region in which the first code information is to be printed;
detecting a second distinct region in which the second code information is to be printed;
detecting a third distinct region in which the first code information and the second code information are to be printed;
forming a first layer on the first region and a portion of the third region, the first layer being made of a first printing material;
forming a second layer on the second region, the second layer being made of a second printing material different from the first printing material;
forming a third layer only on a portion of the first layer on the third region, the third layer being made of the second printing material,
the third layer being formed not to cover at least a part of the first layer corresponding to the third region,
wherein a reflection rate of the third region is substantially equal to a reflection rate obtained by averaging a reflection rate of the first printing material and a reflection rate of the second printing material with respect to light in a first wavelength band and light in a second wavelength band.

28. A method for producing a code sheet on which first code information and second code information are printed, the method comprising the steps of:
detecting a first distinct region in which the first code information is to be printed;

detecting a second distinct region in which the second code information is to be printed;

detecting a third distinct region in which the first region and the second region are overlapped;

forming a first layer on a region of the first region excluding the third region, the first layer being made of a first printing material;

forming a second layer on a region of the second region excluding the third region, the second layer being made of a second printing material different from the first printing material; and arranging a plurality of first small pieces made of the first printing material and a plurality of second small pieces made of the second printing material only on the third region, wherein a reflection rate of the third region is substantially equal to a reflection rate obtained by averaging a reflection rate of the first printing material and a reflection rate of the second printing material with respect to light in a first wavelength band and light in a second wavelength band.

* * * * *